(12) United States Patent
Jung et al.

(10) Patent No.: US 10,971,942 B2
(45) Date of Patent: Apr. 6, 2021

(54) ELECTRONIC DEVICE AND METHOD OF CHARGING A BATTERY USING A PLURALITY OF CHARGING CIRCUITRY IN THE ELECTRONIC DEVICE

(71) Applicant: Samsung Electronics Co., Ltd, Gyeonggi-do (KR)

(72) Inventors: Ku-Chul Jung, Seoul (KR); Sang-Hyun Ryu, Gyeonggi-do (KR); Chul-Woo Park, Gyeonggi-do (KR); Sung-Geun Yoon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 15/348,930

(22) Filed: Nov. 10, 2016

(65) Prior Publication Data
US 2017/0133862 A1 May 11, 2017

(30) Foreign Application Priority Data
Nov. 10, 2015 (KR) .................... 10-2015-0157516

(51) Int. Cl.
*H02J 7/00* (2006.01)
*H01M 10/44* (2006.01)
(Continued)

(52) U.S. Cl.
CPC .......... *H02J 7/007* (2013.01); *H01M 10/4257* (2013.01); *H01M 10/44* (2013.01);
(Continued)

(58) Field of Classification Search
CPC .......... H02J 7/007; H02J 7/022; H02J 7/0052; H02J 7/0029; H02J 7/04; H02J 7/0072;
(Continued)

(56) References Cited

U.S. PATENT DOCUMENTS 6,653,820 B1    11/2003  Smith
2005/0253560 A1*  11/2005  Popescu-Stanesti ...... H02J 1/08
                                                    320/138
(Continued)

FOREIGN PATENT DOCUMENTS

CN    102315665 A    1/2012
CN    102593883 A    7/2012
(Continued)

OTHER PUBLICATIONS

European Patent Office, European Search Report for EP16198019 dated Apr. 6, 2017, 7 pages, publisher EPO, Munich, Germany.
(Continued)

*Primary Examiner* — Richard Isla
*Assistant Examiner* — Manuel Hernandez

(57) ABSTRACT

An electronic device including: a housing, a battery mounted within the housing, a power interface disposed to or within the housing and configured to receive power from an external power source wirelessly or through a wire, and a circuit configured to electrically connect the battery and the power interface. The circuit includes a first electrical path configured to supply a first part of a current supply from the power interface to the battery, and a second electrical path configured to supply a second part of the current supply from the power interface to the battery and connected to the battery in parallel to the first electrical path. The circuit is configured to selectively control the current supply to the battery via the second electrical path at least partially based on at least one of a charge level of the battery or a signal from a sensor disposed in the housing.

16 Claims, 18 Drawing Sheets

(51) Int. Cl.
  *H02J 7/04* (2006.01)
  *H01M 10/42* (2006.01)
  *H01M 10/46* (2006.01)

(52) U.S. Cl.
  CPC ......... *H01M 10/443* (2013.01); *H01M 10/46* (2013.01); *H02J 7/00* (2013.01); *H02J 7/0029* (2013.01); *H02J 7/00309* (2020.01); *H02J 7/04* (2013.01); *H02J 2207/20* (2020.01)

(58) Field of Classification Search
  CPC .. H02J 7/041; H02J 7/0073; H02J 2007/0059; H02J 7/00309; H01M 10/46; H01M 10/4257; H01M 10/44; H01M 10/443
  USPC .................................. 320/150, 162, 163, 164
  See application file for complete search history.

(56) References Cited

U.S. PATENT DOCUMENTS

| | | |
|---|---|---|
| 2006/0103355 A1 | 5/2006 | Patino et al. |
| 2011/0156636 A1 | 6/2011 | Bong-Young |
| 2012/0007547 A1 | 1/2012 | Kim |
| 2012/0161697 A1* | 6/2012 | Park ........................ G06F 1/263 |
| | | 320/108 |
| 2014/0009120 A1* | 1/2014 | Kim ...................... H02J 7/0068 |
| | | 320/138 |
| 2015/0357851 A1* | 12/2015 | Huang ................... H02J 7/025 |
| | | 320/108 |

FOREIGN PATENT DOCUMENTS

| | | |
|---|---|---|
| EP | 2405525 A2 | 1/2012 |
| EP | 2472353 A1 | 7/2012 |
| KR | 10-1997-0024436 | 5/1997 |

OTHER PUBLICATIONS

Office Action dated Jan. 20, 2021 in connection with Chinese Patent Application No. 201610991539.7, 47 pages.

\* cited by examiner

ELECTRONIC DEVICE AND METHOD OF CHARGING A BATTERY USING A PLURALITY OF CHARGING CIRCUITRY IN THE ELECTRONIC DEVICE

CROSS-REFERENCE TO RELATED APPLICATION(S) AND CLAIM OF PRIORITY

The present application is related to and claims priority under 35 U.S.C. § 119(a) to Korean Application Serial No. 10-2015-0157516, which was filed in the Korean Intellectual Property Office on Nov. 10, 2015, the entire content of which is hereby incorporated by reference.

TECHNICAL FIELD

The present disclosure relates to an electronic device and, more particularly, to a method of charging an electronic device.

BACKGROUND

As the use of various portable electronic devices increases, interest in battery capability and battery charging schemes that influence capability and hours of use of the electronic device increases as well. Accordingly, an electronic device capable of wireless charging as well as wired charging has been recently provided, and interest in technology that can charge a battery at a high speed has increased.

In general, fast charging technology corresponds to technology that can charge a battery within a short time and uses a scheme for supplying a high current to the battery for fast charging.

SUMMARY

When a battery is charged, for example, a scheme of charging the battery at a high speed through the supply of high current to the battery may more rapidly generate heat. Such heat may not only cause a loss of charging current in a charging circuit (for example, a charging Integration Circuit (IC)) but also decrease capability of the electronic device.

The charging circuit may receive power from an external power source and supply the charging current to the battery, and has higher charging efficiency as loss power is lower. However, even though the efficiency of the charging circuit maximally increases, if input power increases, loss power increases and thus efficient charging may not be maintained. Further, as the input power becomes higher, a high charging current may be provided to the charging circuit. In this case, the probability of generating heat is high and the heat may influence capabilities of other elements around the charging circuit.

Accordingly, various embodiments of the present disclosure may provide an electronic device and a charging method of an electronic device which may increase charging efficiency and reduce heat by driving charging circuits (for example, charging units) divided into a plurality of sub circuits (for example, a first charging circuit and a second charging circuit) in different modes according to a state of the electronic device (for example, battery temperature or supplied power).

Further, various embodiments of the present disclosure may provide an electronic device and a charging method of an electronic device which perform more efficient charging by selectively using at least one of the plurality of sub circuits (one charging circuit) for fast charging or charging under a particular situation (for example, battery charging amount).

In accordance with an aspect of the present disclosure, an electronic device is provided. The electronic device includes: a housing; a battery mounted within the housing; a power interface mounted to a part or within the housing and configured to receive power from an external power source wirelessly or through a wire; and a circuit configured to electrically connect the battery and the power interface, wherein the circuit may include a first electrical path configured to supply at least a part of the current from the power interface to the battery, and a second electrical path configured to supply another part of the current from the power interface to the battery and connected to the battery in parallel to the first electrical path, and is configured to selectively control the current supply to the battery by the second electrical path at least partially based on a charge level of the battery, and other various embodiments are possible.

In accordance with another aspect of the present disclosure, a method of operating an electronic device is provided. The method includes: supplying at least a part of the current from a power interface to a battery through a first electrical path by an electronic device comprising the battery and the power interface; supplying another part of the current from the power interface to the battery through a second electrical path connected to the battery in parallel to the first electrical path by the electronic device; and selectively controlling the current supply to the battery by the second electrical path at least partially based on a charge level of the battery by the electronic device.

In accordance with another aspect of the present disclosure, an electronic device is provided. The electronic device includes: a housing; a battery mounted within the housing; a power interface mounted to a part of the housing and capable of connecting to an external power source wirelessly or through a wire; at least one sensor disposed within the housing; and a circuit configured to electrically connect between the battery and the power interface, wherein the circuit comprises a first electrical path configured to supply at least a part of the current from the power interface to the battery, and a second electrical path configured to supply another part of the current from the power interface to the battery and connected to the battery in parallel to the first electrical path, and is configured to selectively control the current supply to the battery by the second electrical path at least partially based on at least one of a charge level of the battery and a signal from the sensor.

Various embodiments of the present disclosure can distribute and provide charging currents through charging circuits by selectively driving a plurality of sub groups according to, for example, a state of an electronic device. Accordingly, it is possible to resolve the problem of heat generated by the intensive supply of power to the charging circuit, increase charging efficiency of the electronic device, and improve capabilities of other elements which may be influenced by heat.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
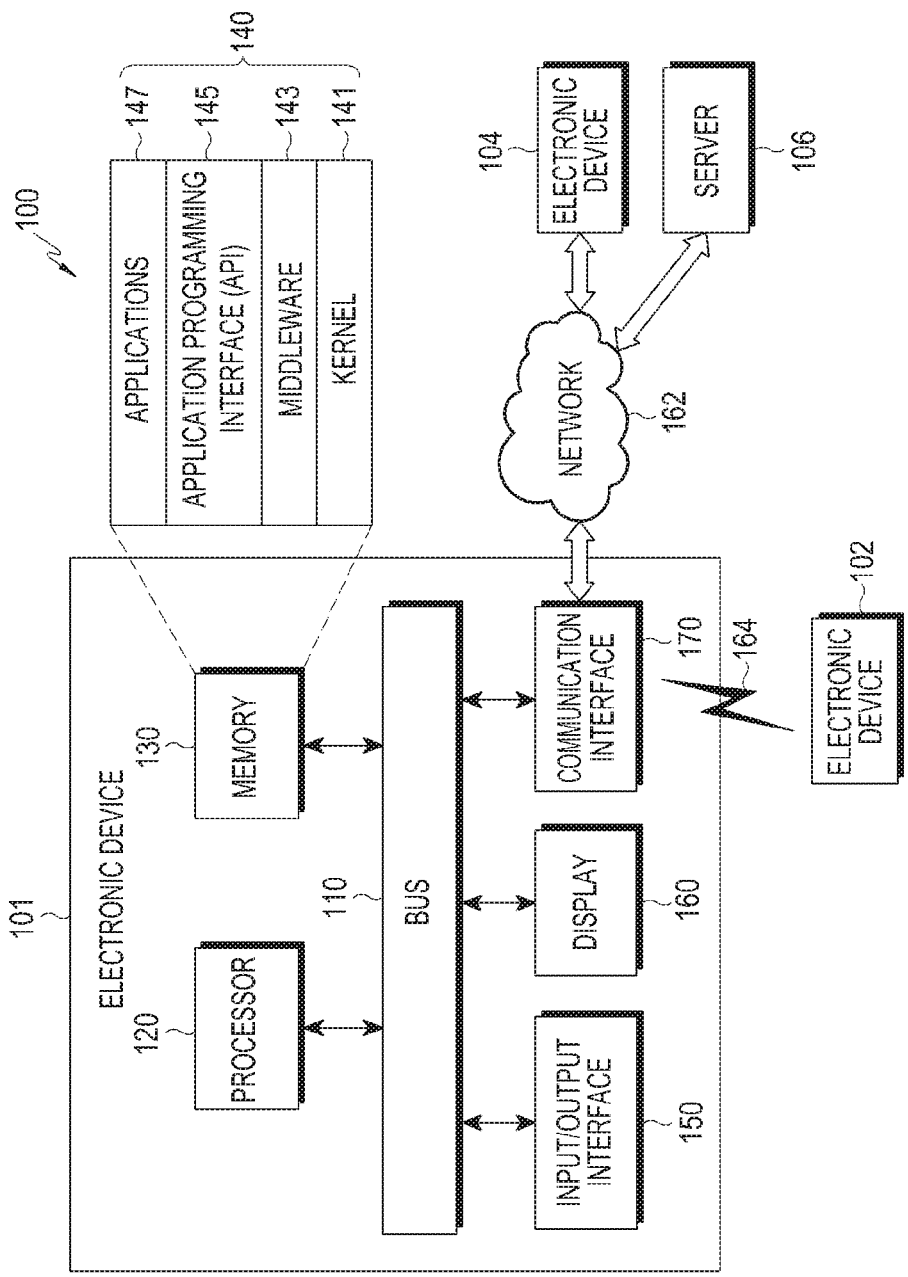
FIG. 1 illustrates a network environment including an electronic device according to various embodiments of the present disclosure.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some instances, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MM), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or interne device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various embodiments will be described with reference to the accompanying drawings. In the present disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit for connecting the components 120 to 170 and transmitting communication (for example, control messages and/or data) between the elements.

The processor 120 may include one or more of a Central Processing Unit (CPU), an Application Processor (AP), and a Communication Processor (CP). For example, the processor 120 may carry out operations or data processing relating to the control and/or communication of at least one other element of the electronic device 101.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (for example, the bus 110, the processor 120, the memory 130, and the like) of the electronic device 101 to one or more of the application programs 147. For example, the middleware 143 may perform scheduling or load balancing on the one or more task requests by processing the one or more task requests according to the priorities assigned to the one or more application programs.

The API 145, which is an interface through which the applications 147 control functions provided from the kernel 141 or the middleware 143, may include, for example, at least one interface or function (for example, instruction) for file control, window control, image processing, text control, and the like The input/output interface 150 may function as, for example, an interface that can forward instructions or data, which are input from a user or an external device, to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (for example, text, images, videos, icons, or symbols) to the user. The display 160 may include a touch screen and receive, for example, a touch, gesture, proximity, or hovering input using an electronic pen or the user's body part.

The communication interface 170 may configure communication, for example, between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), Global System for Mobile Communications (GSM), and the like, as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), and the like The GNSS may include at least one of, for example, a Global Positioning System (GPS), a Glonass® global navigation satellite system ("Glonass"), a Beidou® navigation satellite system (hereinafter, referred to as "Beidou"), and a Galileo® European global satellite-based navigation system ("Galileo"). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), and the like. The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments of the present disclosure, all or some of operations performed by the electronic device 101 may be performed by another electronic device or multiple electronic devices (for example, the first and second external electronic devices 103 and 104 or the server 106). According to an embodiment, when the electronic device 101 has to perform some functions or services automatically or in response to a request, the electronic device 101 may request another device (for example, the electronic device 102 or 104 or the server 106) to perform at least some functions relating thereto instead of, or in addition to, performing the functions or services by itself. Another electronic device (for example, the electronic device 102 or 104 or the server 106) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
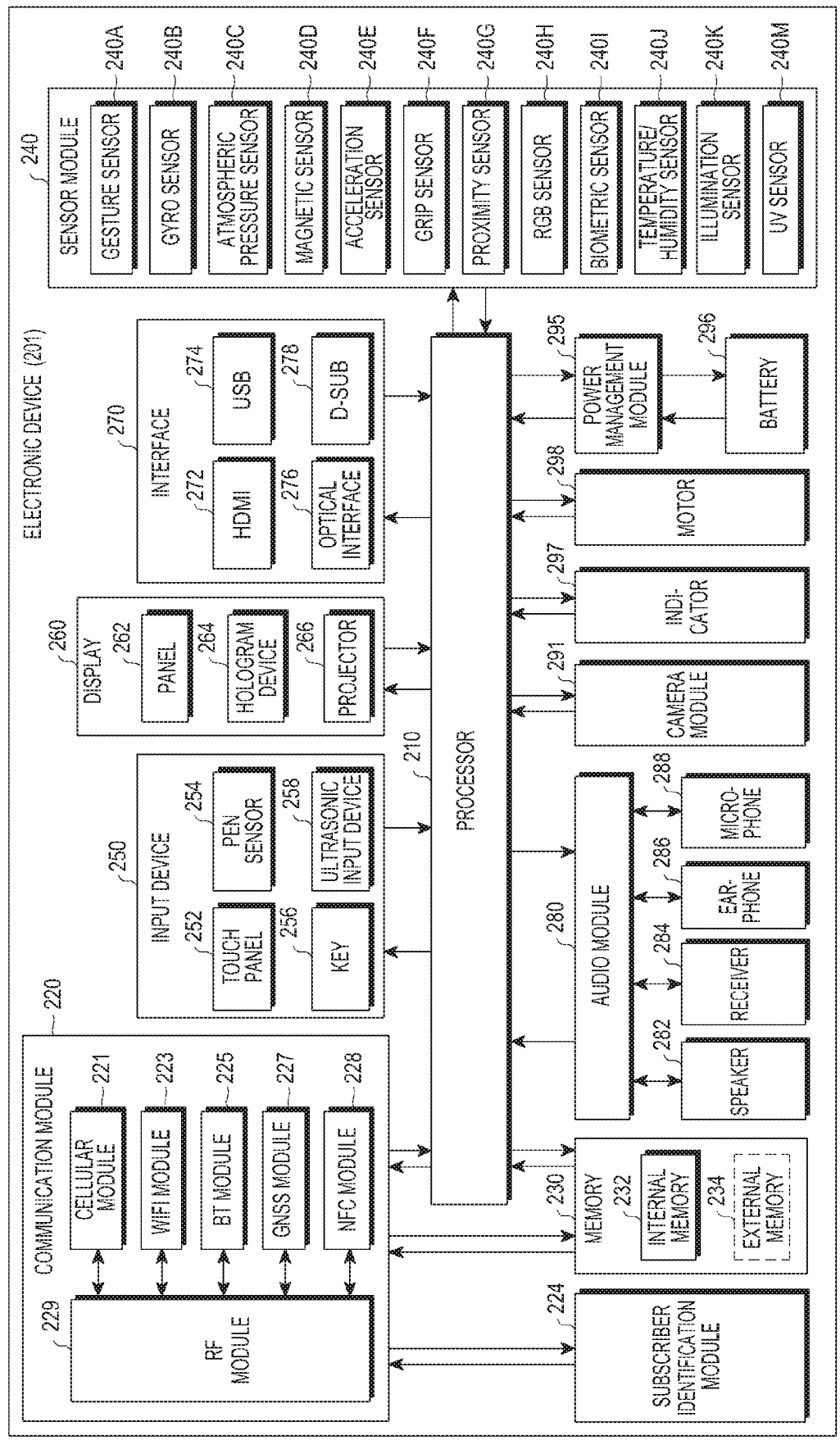
FIG. 2 is a block diagram illustrating an electronic device according to various embodiments of the present disclosure.

FIG. 2 is a block diagram of an electronic device 201 according to various embodiments. The electronic device 201 may include, for example, the entirety or a part of the electronic device 101 illustrated in FIG. 1. The electronic device 201 may include at least one Application Processor (AP) 210, a communication module 220, a Subscriber Identification Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a System on Chip (SoC). According to an embodiment, the processor 210 may further include a Graphic Processing Unit (GPU) and/or an image signal processor. The processor 210 may also include at least some (for example, a cellular module 221) of the elements illustrated in FIG. 2. The processor 210 may load, in a volatile memory, instructions or data received from at least one of the other elements (for example, a non-volatile memory) to process the loaded instructions or data, and may store various types of data in the non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (for example, a GPS module, a Glonass® module, a Beidou® module, or a Galileo® module), an NFC module 228, and a Radio Frequency (RF) module 229.

The cellular module 221 may provide, for example, a voice call, a video call, a text message service, an Internet service, and the like through a communication network. According to an embodiment, the cellular module 221 may identify and authenticate the electronic device 201 within a communication network using a subscriber identification module (for example, the SIM card 224). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GNSS module 227, and the NFC module 228 may include a processor for processing data transmitted/received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package. According to various embodiments, each of the Wi-Fi module 223, the Bluetooth module 225, the GNSS module 227, and the NFC 228 may connect the electronic device 101 with another device (for example, the electronic device 102 or 104, or the server 106) through communication.

The RF module 229, for example, may transmit/receive a communication signal (for example, an RF signal). The RF module 229 may include, for example, a transceiver, a Power Amplifier Module (PAM), a frequency filter, a Low Noise Amplifier (LNA), an antenna, and the like. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory, a NOR flash memory, and the like), a hard disc drive, a Solid State Drive (SSD), and the like).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of, or separately from, the processor 210 and may control the sensor module 240 while the processor 210 is in a sleep state.

The input device 250 may include, for example, a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert, for example, a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, and the like The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, the power of the electronic device 201. According to an embodiment, the power management module 295 may include a circuit for charging the battery 296. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, and the like. Although not illustrated, the electronic device 201 may include a processing unit (for example, a GPU) for supporting mobile TV. The processing unit for supporting the mobile TV may process media data according to a standard, such as Digital Multimedia Broadcasting (DMB), Digital Video Broadcasting (DVB), MediaFlo®, and the like.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
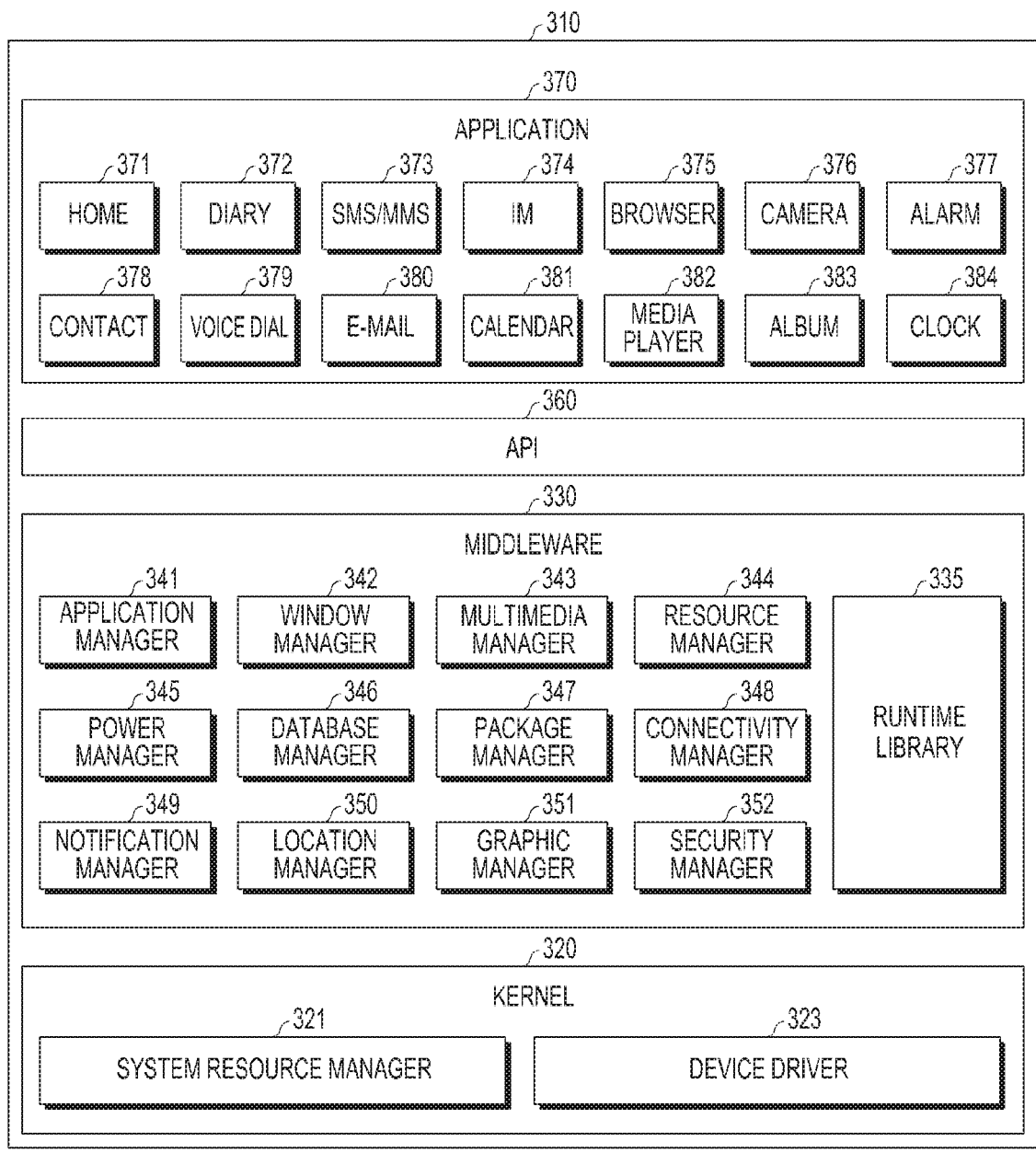
FIG. 3 is a block diagram of a program module according to various embodiments of the present disclosure.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the application programs 147) that are executed in the operating system. The operating system may be, for example, Android®, iOS®, Windows®, Symbian®, Tizen®, Bada®, and the like The program module 310 may include a kernel 320, middleware 330, an Application Programming Interface (API) 360, and/or applications 370. At least a part of the program module 310 may be preloaded on the electronic device, or may be downloaded from an external electronic device (for example, the electronic device 102 or 104 or the server 106).

The kernel 320 (for example, the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth® driver, a shared memory driver, a USB driver, a keypad driver, a Wi-Fi driver, an audio driver, or an Inter-Process Communication (IPC) driver.

The middleware 330 may provide a function required by the applications 370 in common, or may provide various functions to the applications 370 through the API 360 such that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, and the like The application manager 341 may manage, for example, the life cycle of at least one of the applications 370. The window manager 342 may manage Graphical User Interface (GUI) resources used on a screen. The multimedia manager 343 may determine a format required to reproduce various media files, and may encode or decode a media file using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, Bluetooth®, and the like The notification manager 349 may display or notify a user of an event, such as an arrival message, an appointment, a proximity notification, and the like, in such a manner as not to disturb the user. The location manager 350 may manage location information of the electronic device. The graphic manager 351 may manage a graphic effect to be provided to a user and a user interface relating to the graphic effect. The security manager 352 may provide various security functions required for system security, user authentication, and the like. According to an embodiment, in an example where the electronic device (for example, the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (for example, the API 145) is, for example, a set of API programming functions, and may be provided with different configurations according to operating systems. For example, with an Android® or iOS®, one API set may be provided for each platform, and in examples including Tizen®, two or more API sets may be provided for each platform.

The applications 370 (for example, the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (for example, measuring exercise quantity or blood sugar), and environment information (for example, atmospheric pressure, humidity, temperature information, and the like).

According to an embodiment, the applications 370 may include an application (hereinafter, referred to as an "information exchange application" for convenience of description) that supports information exchange between the electronic device (for example, the electronic device 101) and an external electronic device (for example, the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 102 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (for example, install, delete, or update), for example, at least one function of an external electronic device (for example, the electronic device 102 or 104) that communicates with the electronic device (for example, a function of turning on/off the external electronic device itself (or some components thereof) or a function of adjusting the brightness (or resolution) of a display), applications that operate in the external electronic device, or services (for example, a call service, a message service, and the like) that are provided by the external electronic device.

According to an embodiment, the applications 370 may include applications (for example, a health care application of a mobile medical appliance, and the like) that are specified according to attributes of an external electronic device (for example, the electronic device 102 or 104). According to an embodiment, the applications 370 may include applications that are received from an external electronic device (for example, the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least some of the program module 310 may be implemented (for example, executed) by, for example, the processor (for example, the processor 210). At least some of the program module 310 may include, for example, a module, a program, a routine, a set of instructions, and/or a process for performing one or more functions.

According to various embodiments, an electronic device may include: a housing; a battery mounted within the housing; a power interface mounted to a part or within the housing and configured to receive power from an external power source wirelessly or through a wire; and a circuit configured to electrically connect the battery and the power interface, wherein the circuit may include a first electrical path configured to supply at least a part of the current from the power interface to the battery, and a second electrical path configured to supply another part of the current from the power interface to the battery and connected to the battery in parallel to the first electrical path, and is configured to selectively control the current supply to the battery by the second electrical path at least partially based on a charge level of the battery, and other various embodiments are possible.

According to various embodiments, the circuit may be configured to block the current supply to the battery by the second electrical path at least partially based on a determination that the charge level of the battery is higher than a threshold value.

According to various embodiments, the circuit may be configured to limit an amount of power received from the external power source wirelessly or through the wire.

According to various embodiments, the electronic device may further include a display disposed on one surface of the housing, and the circuit may be configured to display a user interface configured to control at least a part of the circuit on at least a part of the display and to selectively control the current supply to the battery by the second electrical path further based on a user input for the user interface.

According to various embodiments, the electronic device may further include at least one sensor disposed within the housing, and the circuit may be configured to selectively control the current supply to the battery by the second electrical path at least partially based on at least one of the charge level of the battery and a signal from the sensor.

According to various embodiments, the circuit may be configured to selectively control the current supply to the battery by the second electrical path further based on a detection of heat generated in at least a part of the circuit, at least a part of the battery, and surroundings of the housing through the sensor.

According to various embodiments, the electronic device may further include control circuit, and the control circuit may make a control to block the current supply to the battery by the second electrical path when the current supply by the first electrical path switches from a Constant Current (CC) state to a Constant Voltage (CV) state during the current supply to the battery through the first electrical path and the second electrical path.

According to various embodiments, the electronic device may further include a control circuit, and the control circuit may make a control to block the current supply by the second electrical path or to adjust a charging current supply ratio by the first electrical path and the second electrical path when a charging residual quantity of the battery or a voltage of the battery is higher than or equal to a predetermined level during the current supply to the battery through the first electrical path and the second electrical path.

According to various embodiments, the electronic device may further include a control circuit, and the control circuit may determine an input voltage level input by the power interface and makes a control to adjust a charging current supplyratio by the first electrical path and the second electrical path according to the input voltage level.

According to various embodiments, the electronic device may further include a control circuit, and the control circuit may determine a module used by an executed application and make a control to adjust a charging current supplyratio by the first electrical path and the second electrical path according to a distance between the used module and each of a first charging circuit and a second charging circuit that provides the first electrical path and the second electrical path, respectively.

According to various embodiments, the electronic device may further include a control circuit, and the control circuit may make a control to block the current supply by the second electrical path or to adjust a charging current supply ratio by the first electrical path and the second electrical path when a temperature of at least one of at least a part of the circuit, at least a part of the battery, and surroundings of the housing increases to be a predetermined temperature during the current supply to the battery through the first electrical path and the second electrical path.

According to various embodiments, the circuit may include a first charging circuit electrically connected between the power interface and the battery and a second charging circuit electrically connected between the power interface and the battery.

According to various embodiments, the circuit may include a main charging circuit electrically connected between the power interface and the battery and a secondary charging circuit electrically connected between the main charging circuit and the battery.

According to various embodiments, the main charging circuit may include a first terminal electrically connected to the power interface, a second terminal electrically connected to the secondary charging circuit, and a third terminal electrically connected to the battery.

According to various embodiments, the main charging circuit may further include a fourth terminal electrically connected to at least one electronic element within the electronic device.

According to various embodiments, an electronic device may include: a housing; a battery mounted within the housing; a power interface mounted to a part of the housing and capable of connecting to an external power source wirelessly or through a wire; at least one sensor disposed within the housing; and a circuit configured to electrically connect between the battery and the power interface, wherein the circuit comprises a first electrical path configured to supply at least a part of the current from the power interface to the battery, and a second electrical path configured to supply another part of the current from the power interface to the battery and connected to the battery in parallel to the first electrical path, and is configured to selectively control the current supply to the battery by the second electrical path at least partially based on at least one of a charge level of the battery and a signal from the sensor.

According to various embodiments, the circuit of the electronic device may be configured to selectively control the current supply to the battery by the second electrical path further based on a detection of heat generated in at least a part of the circuit, at least a part of the battery, and surroundings of the housing through the sensor.

Figure 4:
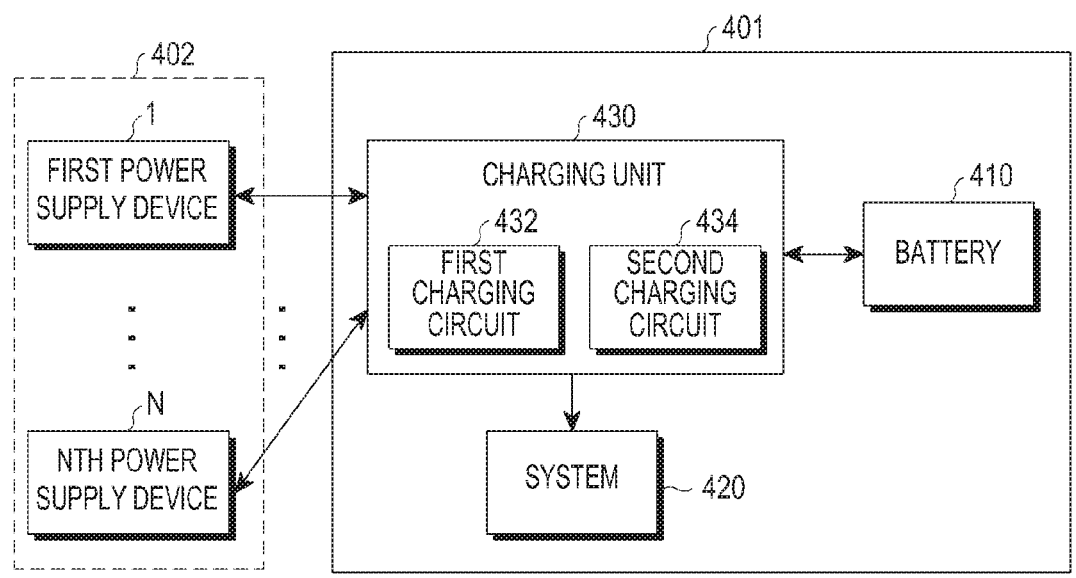
FIG. 4 is a block diagram illustrating a charging unit in an electronic device according to various embodiments of the present disclosure.

FIG. 4 is a block diagram illustrating an electronic device for describing a concept of a charging unit in the electronic device according to various embodiments.

Referring to FIG. 4, an electronic device 401 according to various embodiments of the present disclosure may be connected to an external device 402, for example, one power supply device (first power supply device) or a plurality of power supply devices (first to $N^{th}$ power supply devices). According to various embodiments of the present disclosure, one power supply device (first power supply device) or each of the plurality of power supply devices (first to $N^{th}$ power supply devices) may be a wireless charging device or a wired charging device. For example, the wired charging device may include a Travel Adapter (TA) type or an On The Go (OTG) type power supply device, and the wireless charging device may include a wireless power supply device or a wireless power transmission/reception device. According to an embodiment, one power supply device (first power supply device) or each of the plurality of power supply devices (first to $N^{th}$ power supply devices) may be connected to the charging unit 430 through a power interface (not shown) installed in a part of the housing of the electronic device 401. For example, the power interface may be a connection port (USB port) to which the wired charging device, for example, the TA type or the OTG type power supply device can be connected, or may be a wireless charging pad which can receive power by the wireless power supply device.

According to various embodiments, the electronic device 401 may include a battery 410, a system 420, and the charging unit 430. The battery 410 may be mounted within the housing of the electronic device, and charged through the charging unit 430. The battery 410 may include, for example, a rechargeable battery and/or a solar battery.

According to various embodiments, the system 420 may be at least one electronic element that receives power and operates within the electronic device 401 or a module that supplies power to at least one electronic element within the electronic device 401. According to various embodiments of the present disclosure, the charging unit 430 may be configured to electrically connect the one power supply device (first power supply device) or the plurality of power supply devices (first to $N^{th}$ power supply devices) and the battery 410. The charging unit 430 may supply, for example, at least some of the power supplied from one or more external power supply devices 402 to the battery 410 or the system 420. The charging unit 430 may include a first charging circuit 432 configured to supply at least a part of the power provided from the one power supply device (first power supply device) or the plurality of power supply devices (first to $N^{th}$ power supply devices) to the battery 410 or the system 420 and a second charging circuit 434 configured to supply at least another part of the power provided from the one power supply device (first power supply device) or the plurality of power supply devices (first to $N^{th}$ power supply devices) to the battery 410 or the system 420.

According to various embodiments, although it is illustrated that the first charging circuit 432 and the second charging circuit 434 are included in the charging unit 430, the first charging circuit 432 and the second charging circuit 434 may be circuits physically separated from each other. For example, the first charging circuit 432 and the second charging circuit 434 may be implemented as one charging Integrated Circuit (IC), but the first charging circuit 432 and the second charging circuit 434 may be implemented as charging ICs physically separated from each other. For example, the first charging circuit 432 may be included in the first charging IC and the second charging circuit 434 may be included in the second charging IC physically separated from the first charging IC.

According to various embodiments, the first charging circuit 432 may be a main charging circuit, and the second charging circuit 434 may be a secondary charging circuit. According to various embodiments, when the first charging circuit 432 is the main charging circuit and the second charging circuit 434 is the secondary charging circuit, the first charging circuit 432 may be electrically connected between one or more power supply devices (first power supply device or first to $N^{th}$ power supply devices) and the battery 410 or the system 420, and the second charging circuit 434 may be electrically connected to the first charging circuit 432 and the battery 410. Accordingly, power supplied to the first charging circuit 432 may be supplied to, for example, at least one of the battery 410 and the system 420, and power supplied to the second charging circuit 434 may be supplied to, for example, only the battery 410. A detailed example related thereto will be described with reference to FIGS. 5A and 5B.

According to an embodiment, the first charging circuit 432 may include at least one of a first terminal electrically connected to the one power supply device (first power supply device) or the plurality of power supply devices (first to $N^{th}$ power supply devices), a second terminal electrically connected to the second charging circuit 434, and a third terminal electrically connected to the battery 410. Further, the first charging circuit 432 may further include a fourth terminal electrically connected to at least one electronic element (system) within the electronic device 401.

According to various embodiments of the present disclosure, the charging unit 430 may receive power from the one power supply device (first power supply device) or the plurality of power supply devices (first to $N^{th}$ power supply devices). The received power may be supplied to at least one of the first charging circuit 432 and the second charging circuit 434. The charging unit 430 may perform an input current sensing function, an input current limit function, a reverse current block function, and an external device recognition function. For example, the charging unit 430 may detect an input current flowing into the charging unit 430 (for example, the first charging circuit 432 or the second charging circuit 434) from the power supply device 402 according to the input current sensing function, make a predetermined current flow into at least one of the first charging circuit 432 and the second charging circuit 434 by controlling the input current according to the input current limit function, prevent a reverse current flow (for example, from the first charging circuit 432 to the external power supply device 402) according to the reverse current block function, and recognize an external device connected to the electronic device 401 according to the external device recognition function.

According to various embodiments, when a Universal Serial Bus (USB) port is used as a power interface, the charging unit 430 may recognize, through a signal of a D+/D− pin or an ID pin, whether an external device is connected. According to various embodiments, the charging unit 430 may recognize whether the external device is a wired power supply device or wireless power supply device. When the external device is the wired power supply device, the charging unit 430 may recognize whether the external device is, for example, a TA type or an OTG type power supply device. According to various embodiments, when the external device is the wireless power supply device, the charging unit 430 may recognize, through a wireless charging protocol (WPC, A4WP, or PMA), whether the external device is a wireless charging pad.

FIGS. 5A to 5E are block diagrams of a charging unit in an electronic device according to various embodiments.

Figure 5A:
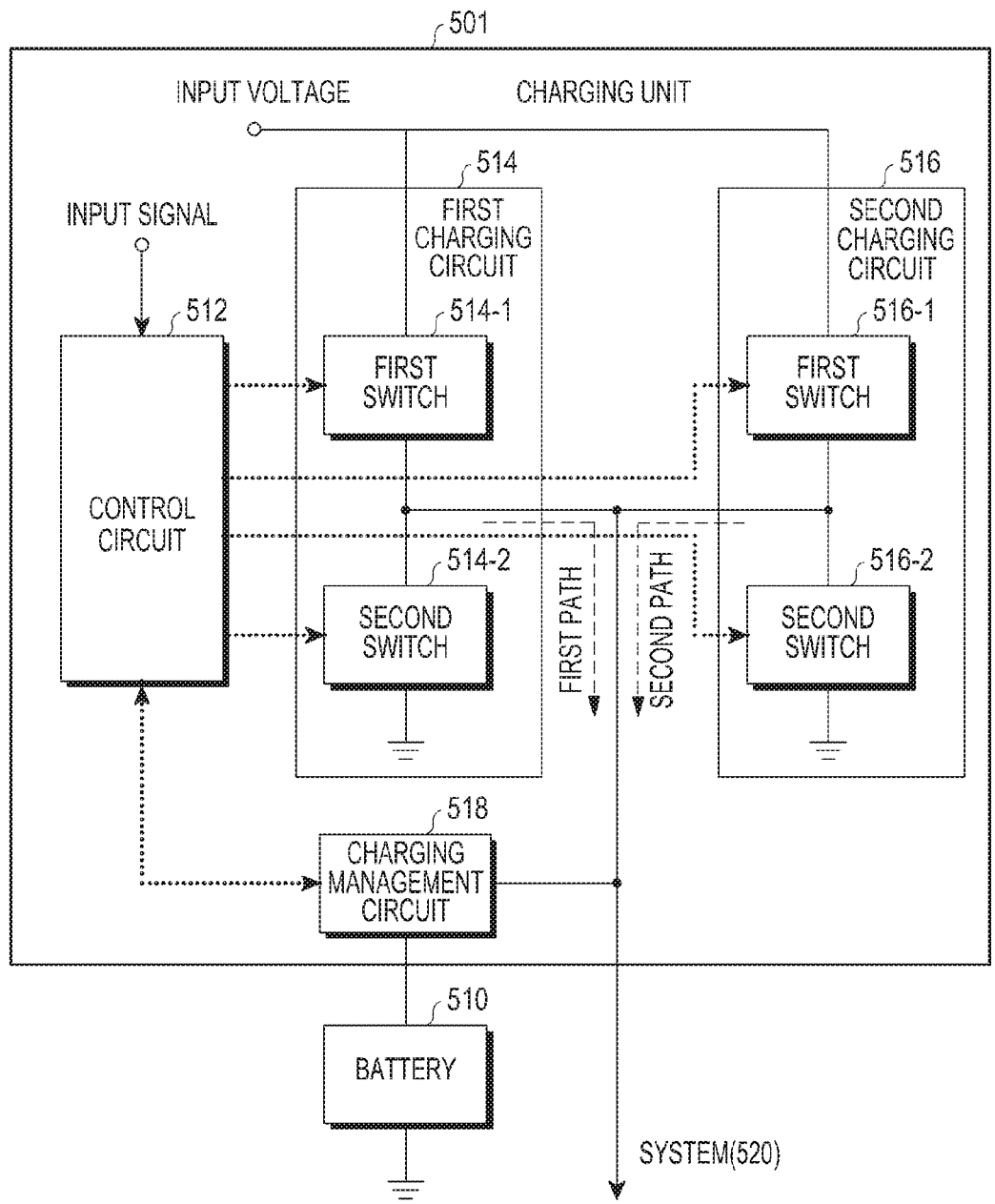
FIGS. 5A to 5E are block diagrams illustrating charging circuits in an electronic device according to various embodiments of the present disclosure.

Referring to FIG. 5A, a charging unit 501 (for example, the charging unit 430) may include a control circuit 512, a first charging circuit 514, a second charging circuit 516, and a charging management circuit 518.

According to various embodiments of the present disclosure, the control circuit 512 may selectively drive the first charging circuit 514 (for example, the first charging circuit 432) and/or second charging circuit 516 (for example, the second charging circuit 434) according to a state of the electronic device (for example, the electronic device 401) by controlling the first charging circuit 514, the second charging circuit 516, or the charging management circuit 518. The control circuit 512 may be configured to perform a charging current sensing function, a charging cut off function, an input current limit function, a Constant Current (CC) loop function, a Constant voltage (CV) loop function, a termination current loop function, a recharging loop function, and a battery to system FET loop function by controlling the first charging circuit 514, the second charging circuit 516, or the charging management circuit 518. For example, the control circuit 512 may control the charging management circuit 518 to detect a charging current amount applied to charge a battery 510 according to the charging current sensing function, and control the charging management circuit 518 to stop charging the battery 510 according to the charging cut off function when the battery 510 is overcharged or overheated. The control circuit 512 may control the first charging circuit 514 or the second charging circuit 516 to prevent a predetermined or larger current from being input by controlling the input current according to the input current limit function, control the first charging circuit 514 or the second charging circuit 516 to uniformly supply the charging current according to the CC loop function, and control the first charging circuit 514 or the second charging circuit 516 to uniformly maintain the charging voltage according to the CV loop function. Further, the control circuit 512 may control the charging management circuit 518 to terminate the charging according to the termination current loop function and control the charging management circuit 518 to perform recharging according to the recharging loop function. In addition, the control circuit 512 may control a voltage and current between the battery 510 and the system 520 according to the battery to system FET loop function. For example, the control circuit 512 may control the charging management circuit 518 to supply the voltage charged in the battery 510 to the system 520. For example, the control circuit 512 may provide the voltage charged in the battery 510 to the system 520 by turning on/turning off a switch (not shown) included in the charging management circuit 518.

According to various embodiments, the first charging circuit 514 and/or the second charging circuit 516 may selectively accept an input voltage supplied from an external power supply device (for example, the power supply device 402) based on a state of the electronic device (for example, an amount of voltage charged in the battery 510) under a control of the control circuit 512. To this end, according to an embodiment, the first charging circuit 514 and/or the second charging circuit 516 may include one or more switches. According to an embodiment, the first charging circuit 514 may include at least one first switch 514-1 and at least one second switch 514-2. The second charging circuit 516 may include at least one first switch 516-1 and at least one second switch 516-2. Although FIG. 5A illustrates that each of the first charging circuit 514 and/or the second charging circuit 516 includes one first switch 514-1 and one first switch 516-1, respectively, each of the first charging circuit 514 and/or the second charging circuit 516 may include a plurality of first switches in a serial structure, in a parallel structure, or in a combination structure thereof. According to an embodiment, although it is described that each of the first charging circuit 514 and/or the second charging circuit 516 includes one second switch 514-2 and one second switch 516-2, respectively, each of the first charging circuit 514 and/or the second charging circuit 516 may include a plurality of second switches in a serial structure, in a parallel structure, or in a combination structure thereof According to an embodiment, each of the first switch 514-1 and/or the second switch 514-2 of the first charging circuit 514 may include at least one switch, and may perform a step-up transform operation or a step-down transform operation through an on/off operation according to a control of the control circuit 512. For example, according to a control of the control circuit 512, the first switch 514-1 may be turned on and the second switch 514-2 may be turned off, or the first switch 514-1 may be turned off and the second switch 514-2 may be turned on. According to an embodiment, when the first switch 514-1 is turned on and the second switch 514-2 is turned off, the voltage and current for the charging may be accumulated in an accumulation circuit (not shown) of the first charging circuit 514. According to an embodiment, when the first switch 514-1 is turned off and the second switch 514-2 is turned on, the voltage and current accumulated in the accumulation circuit may be supplied to the battery 510 or the system 520. According to an embodiment, the first charging circuit 514 may be configured as various converters, for example, a buck converter, a boost converter, a boost-buck converter, and a buck-boost converter.

Each of the first switch 516-1 and/or the second switch 516-2 of the second charging circuit 516 may include at least one switch, and may perform a step-up transform operation or a step-down transform operation through an on/off operation according to a control of the control circuit 512. According to an embodiment, the first switch 516-1 may be turned on and the second switch 516-2 may be turned off, or the first switch 516-1 may be turned off and the second switch 516-2 may be turned on according to a control of the control circuit 512. According to an embodiment, when the first switch 516-1 is turned on and the second switch 516-2 is turned off, the voltage and the current for charging may accumulate in an accumulation circuit (not shown). When the first switch 516-1 is turned off and the second switch 516-2 is turned on, the voltage and the current accumulated in the accumulation circuit may be supplied to the battery 510 or the system 520.

According to an embodiment, the second charging circuit 516 may be configured as various converters, for example, a buck converter, a boost converter, a boost-buck converter, and a buck-boost converter.

The charging management circuit 518 may detect a charging current provided from the battery 510 or the system 520, and may stop charging the battery 510 or providing the charging current to the system 520 according to a charging stop control signal from the control circuit 512 when overcharging or overheating is made. Further, the charging management circuit 518 may terminate the charging of the battery 510 according to a charging termination control signal from the control circuit 512. In addition, the charging management circuit 518 may perform recharging of the battery 510 according to a recharging control signal from the control circuit 512 and control the voltage and current between the battery 510 and the system 520 according to a battery to system FET loop control signal from the control circuit 512. According to an embodiment, the control circuit 512 may drive the first charging circuit 514 and/or the second charging circuit 516 in different modes according to a state of the electronic device (for example, an amount of charging voltage charged in the battery 510). For example, according to the state of the electronic device, the control circuit 512 may supply the accumulated charging voltage to the battery 510 or the system 520 by driving only the first charging circuit 514, supply the accumulated charging voltage to the battery 510 or the system 520 by driving only the second charging circuit 516, and supply the accumulated charging voltage to the battery 510 or the system 520 by driving both the first charging circuit 514 and the second charging circuit 516. According to an embodiment, the control circuit 512 may supply the accumulated charging voltage to at least one of the battery 510 and the system 520 by selectively driving one of the first charging circuit 514 and/or the second charging circuit 516 (for example, the second charging circuit 516) while driving the other charging circuit (for example, the first charging circuit 514) according to the state of the electronic device.

According to an embodiment, the control circuit 512 may receive feedback of information on the amount of voltage charged in the battery 510 (temperature of the battery) from the charging management circuit 518 as an example of the state of the electronic device. For example, the charging management circuit 518 may detect the amount of charging voltage of the battery 510 and provide a signal therefore to the control circuit 512. According to an embodiment, when the voltage charged in the battery 510 is equal to or below a first battery reference voltage (for example, a charging state equal to or below 10 to 20% of the whole battery capacity), the control circuit 512 may supply the charging voltage to the battery 510 and/or the system 520 by driving both the first charging circuit 514 and the second charging circuit 516. For example, when the voltage charged in the battery 510 is equal to or above a second battery reference voltage (for example, a charging state equal to or above 90 to 95% of the whole battery capacity), the control circuit 512 may supply the charged charging voltage to the battery 510 and/or the system 520 by stopping the driving of the second charging circuit 516 and driving only the first charging circuit 514.

In the above description, although the example of controlling the driving mode of the first charging circuit 514 and the second charging circuit 516 based on the charging state of the battery 510 has been described, the driving mode of the first charging circuit 514 and the second charging circuit 516 may be controlled according to a charging time, an input voltage/current (for example, charging termination current) supplied from an external power device, a temperature of the electronic device (for example, temperature of an internal element itself or surface temperature of the electronic device), or a screen brightness state of the display (for example, the display 160) as well as the charging state. According to an embodiment, at least one of the factors for controlling the driving mode of the first charging circuit 514 and/or the second charging circuit 516 may be input as an input signal of the control circuit 512. Accordingly, the control circuit 512 may control the driving mode of at least one of the first charging circuit 514 and/or the second charging circuit 516 based on the input signal.

According to an embodiment, the charging voltage charged through the first charging circuit 514 and/or the second charging circuit 516 may be supplied to the battery 510 or the system 520 through at least one of a first path (for example, a first electrical path) and/or a second path (for example, a second electrical path). For example, when the first switch 514-1 of the first charging circuit 514 is turned on and the second switch 514-2 is turned off, the voltage supplied from the external power device may accumulate in the first switch 514-1. According to an embodiment, when the second switch 514-2 is turned on, the voltage accumulated in the first switch 514-1 may be supplied to the battery 510 or the system 520 through the charging management module 518 along the first path. According to an embodiment, when the second switch 514-2 is turned on, the first switch 514-1 may be turned off.

According to an embodiment, when the first switch 516-1 of the second charging circuit 516 is turned on and the second switch 516-2 is turned off, the voltage supplied from the external power device may accumulate in the first switch 516-1. According to an embodiment, when the second switch 516-2 is turned on, the voltage accumulated in the first switch 516-1 may be supplied to the battery 510 or the system 520 through the charging management module 518 along the second path. According to an embodiment, when the second switch 516-2 is turned on, the first switch 516-1 may be turned off According to an embodiment, when both the first charging circuit 514 and the second charging circuit 516 are driven according to the state of the electronic device, an interval where the first switch 514-1 of the first charging circuit 514 is turned on and an interval where the first switch 516-1 of the second charging circuit 516 is turned on may be at least temporarily different. For example, the first switch 514-1 of the first charging circuit 514 may be turned on-turned off based on a first period and the first switch 516-1 of the second charging circuit 516 may be turned on-turned off based on a second period. According to a difference between the first period and the second period, turned-on intervals of the first switch 514-1 of the first charging circuit 514 and the first switch 516-1 of the second charging circuit 516 may be different at least temporarily. According to another embodiment, since turned-on time points of the first switch 514-1 and the second switch 516-1 are different even though the first period and the second period are the same, the turned-on intervals of the first switch 514-1 of the first charging circuit 514 and the first switch 516-1 of the second charging circuit 516 may be different.

According to an embodiment, the charging management circuit 518 may include one or more switches. Further, the one or more switches may maintain, for example, a turned-on state while the input voltage is supplied from the external power device. Accordingly, the charging management circuit 518 may supply the charged voltage to the battery 510 through, for example, the first charging circuit 514 and/or the second charging circuit 516. Further, the charging management circuit 518 may transmit feedback to the control circuit 512 by detecting a charging state of the battery 510 (for example, a current voltage amount of the battery 510). When the input voltage is not supplied from the external power device, the charging management circuit 518 may be turned off. According to an embodiment, even though the input voltage is not supplied from the external power device, for example, in a turned-off state, one or more switches included in the charging management circuit 518 may be turned on. Therefore, the voltage charged in the battery 510 may be supplied to, for example, the system 520 and thus various functions of the electronic device (for example, an image output through the display or a sound output through a speaker) may be performed.

According to an embodiment, the control circuit 512 may be functionally connected to the display and may receive a signal corresponding to a user input acquired through the display as an input signal. For example, although not illustrated, the display may display a user interface that may set a driving mode of the charging unit 501. For example, the user interface may output an image (for example, an image including a number, character, emoticon, icon, special character, or figure) through which the user can select at least one of the first charging circuit 514 and/or the second charging circuit 516. According to another example, mode information corresponding to at least one of a first mode in which only the first charging circuit 514 is driven, a second mode in which only the second charging circuit 516 is driven, a third mode in which both the first charging circuit 514 and the second charging circuit 516 are driven, and a fourth mode in which the first charging circuit 514 is driven and the second charging circuit 516 is selectively driven may be included in the user interface. As an example of the first mode to the fourth mode, at least one mode may be omitted and one or more other modes may be further added according to various circuit implementations.

According to an embodiment, when a charging level which can be supplied to the battery 510 according to a charging state is higher than a predetermined charging level, for example, when the battery 510 is charged with a particular voltage higher than or equal to the predetermined charging level at a high speed, the control circuit 512 may provide a control signal to each of the first charging circuit 514 and the second charging circuit 516 to supply the current to the battery 510 through the first path and the second path. In contrast, when the battery charging level which can be supplied to the battery 510 is lower than the predetermined charging level, for example, when a battery temperature increases to be a particular temperature or higher or a charging mode of the first charging circuit 514 switches from a CC interval to a CV interval, the control circuit 512 may deactivate the second charging circuit 516. That is, the control circuit 512 may provide a control signal to block the power supply through the second path by the second charging circuit 516 and to supply the current to the battery 510 through the first path by the first charging circuit 514.

According to an embodiment, when charging starts, the control circuit 512 may make a control to operate both the first charging circuit 514 and the second charging circuit 516.

When a sum of the charging current supplied to the battery 510 through the first path and the charging current supplied to the battery 510 through the second path is lower than an end of charge current, the second charging circuit 516 may be deactivated. That is, the control circuit 512 may provide a control signal to block the current supply through the second path by the second charging circuit 516 and to supply the current to the battery 510 through the first path by the first charging circuit 514.

According to an embodiment, the control circuit 512 may receive an input signal according to a heating state of each of the first charging circuit 514 and the second charging circuit 516. The control circuit 512 may provide a control signal to each of the first charging circuit 514 and the second charging circuit 516 to supply the current to the battery 510 or the system 520 through an electrical path of the charging circuit between the two charging circuits 514 and 516 having a temperature detected by the heating detection that is equal to or lower than a predetermined threshold temperature based on the input signal according to the heating state. For example, when a heating temperature of the first charging circuit 514 is a first temperature (for example, about 55 to 65 degrees) and a heating temperature of the second charging circuit 516 is a second temperature (for example, about 75 to 85 degrees) that is higher than the first temperature, the control circuit 512 may drive only the first charging circuit 514 and stop the charging through the second charging circuit 516.

According to an embodiment, the control circuit 512 may distribute the input voltage supplied from the external power supply device (for example, power supply device 402) based on a setting value preset to the electronic device (for example, a charging efficiency ratio or a predetermined voltage distribution ratio of the first charging circuit 514 and the second charging circuit 516). For example, the control circuit 512 may distribute the input voltage to the first charging circuit 514 and the second charging circuit 516 according to a charging efficiency rate indicating a ratio of the charging efficiency of the second charging circuit 516 to the charging efficiency of the first charging circuit 514. That is, the control circuit 512 may distribute a higher input voltage to a charging circuit (for example, the first charging circuit 514) having a relatively high charging efficiency compared to a charging circuit (for example, the second charging circuit 516) having a relatively low charging efficiency. Alternatively, for example, the control circuit 512 may distribute the input voltage to the first charging circuit 514 and the second charging circuit 516 according to a predetermined voltage distribution ratio. For example, when the voltage distribution ratio is 1:1, the input voltage may be equally distributed to the first charging circuit 514 and the second charging circuit 516. The voltage distribution ratio is not limited thereto, and may have various voltage distribution ratios such as 1:1.2 or 1:1.5 according to a design of the charging circuit.

According to an embodiment, the control circuit 512 may make a control to reduce the current supplied to the battery 510 or the system 520 through the electrical path of the charging circuit having a temperature higher than or equal to a preset threshold temperature between the first charging circuit 514 and the second charging circuit 516 and to increase the current supplied to the battery 510 or the system 520 through the electrical path by the charging circuit having a temperature lower than the preset threshold temperature. For example, the control circuit 512 may detect the temperature of the corresponding charging circuit through a thermistor (not shown) of each charging circuit. When the temperature of the first charging circuit 514 detected by the corresponding thermistor is higher than or equal to the preset threshold temperature and the temperature of the second charging circuit 516 detected by the corresponding thermistor is lower than the preset threshold temperature, the control circuit 512 may provide the first charging circuit 514 and the second charging circuit 516 with a control signal to reduce the current supplied to the battery 510 or the system 520 through the electrical path (for example, first path) by the first charging circuit 514 and to increase the current supplied to the battery 510 or the system 520 through the electrical path (for example, second path) by the second charging circuit 516.

According to an embodiment, when the charging starts and when the current supply is maintained in a Constant Current (CC) state, for example, a state where a constant charging current is supplied to charge the battery 510 and then a voltage of the battery 510 reaches a predetermined charging voltage, the control circuit 512 may perform charging while gradually reducing the charging current and maintain a Constant Voltage (CV) state where the voltage is constant. When a charging state of the current supply by the first electrical path switches from the CC state to the CV state while the current is supplied to the battery 510 through the first electrical path by the first charging circuit 514 and the second electrical path by the second charging circuit 516, the control circuit 512 may make a control to block the current supply by the second charging circuit 516.

According to an embodiment, the CC state corresponds to a charging mode state in which the battery is charged with a constant charging current through a control of the current. In the CC state, a current (for example, about 1 to 2 A) which can be set according to the capacity of the battery may be continuously supplied and the voltage of the battery may gradually increase up to a fully charged voltage. When the voltage of the battery reaches the fully charged voltage, the charging mode may change from the CC state to the CV state. The CV state corresponds to a charging mode state in which the battery is charged with a constant charging voltage through a control of the voltage. In the CV state, the voltage that reaches the fully charged voltage is continuously supplied to the battery and accordingly the current provided to the battery gradually decreases. As described above, when the gradually decreasing current becomes equal to or lower than a predetermined end of charging current, the control circuit 512 may terminate the charging by providing a charging termination control signal to the first charging circuit 514.

According to an embodiment, when a State of Charging (SOC) or a battery voltage becomes in a charging state higher than or equal to a predetermined level while the current is supplied to the battery 510 through the first electrical path by the first charging circuit 514 or the second electrical path by the second charging circuit 516, the control circuit 512 may make a control to block the current supply by the second charging circuit 516 or to adjust a charging current ratio supplied by the first charging circuit 514 and the second charging circuit 516. For example, when a State of Charging (SOC) or a battery voltage reaches a charging state higher than or equal to a predetermined level voltage while the current is supplied to the battery 510 through the first electrical path by the first charging circuit 514 or the second electrical path by the second charging circuit 516, the control circuit 512 may adjust the charging current ratio to reduce the charging current supplied by the second charging circuit 516. According to an embodiment, the charging current ratio may be a predetermined ratio that corresponds to a ratio between the charging current supplied by the first charging circuit 514 and the charging current supplied by the second charging circuit 516.

According to an embodiment, the control circuit 512 may determine an input voltage level of the input voltage input from the external device and control a charging current ratio by the first charging circuit 514 and the second charging circuit 516 according to a charging state corresponding to the input voltage level, so as to supply the charging current to the battery 510 through the first electrical path by the first charging circuit 514 and the second electrical path by the second charging circuit 516. For example, if the input voltage level is higher than a predetermined threshold voltage level when the charging current is supplied to the battery 510 through the first charging circuit 514 and the second charging circuit 516, the ratio of the charging current supplied by the second charging circuit 516 may be higher than a predetermined ratio.

According to an embodiment, the control circuit 512 may set a driving mode in which both the first charging circuit 514 and the second charging circuit 516 are driven among various driving modes of the charging unit 501 by default. In this example, when the charging starts, the control circuit 512 may supply the charged voltage to the battery 510 and/or the system 520 by driving both the first charging circuit 514 and the second charging circuit 516. Thereafter, when a sum of the current supplied to the battery 510 and/or the system 520 through the first electrical path by the first charging circuit 514 and the current provided to the battery 510 and/or the system 520 through the second electrical path by the second charging circuit 516 becomes equal to or lower than a preset current (for example, end of charge current), the control circuit 512 may supply the charged charging voltage to the battery 510 and/or the system 520 by stopping driving the second charging circuit 516 and driving only the first charging circuit 514.

According to an embodiment, the control circuit 512 may determine a module used by an executed application and control the charging current ratio by the first charging circuit 514 and the second charging circuit 516 according to a distance between the used module and each of the first charging circuit 514 and the second charging circuit 516, so as to supply the charging current to the battery 510 and/or the system 520 through the first electrical path by the first charging circuit 514 and the second electrical path by the second charging circuit 516. For example, the module used by the executed application may be one of various modules such as a camera module, a modem, a Radio Frequency (RF) module, and an Application Processor (AP).

According to an embodiment, when the camera module is used, the control circuit 512 may charge the battery 510 through at least one of the first charging circuit 514 and/or the second charging circuit 516 based on a distance between the camera module and each of the first charging circuit 514 and the second charging circuit 516. For example, when a first distance between the first charging circuit 514 and the camera module is longer than a second distance between the second charging circuit 516 and the camera module, the control circuit 512 may control the current ratio to make an amount of the charging current supplied by the first charging circuit 514 larger than an amount of the charging current supplied by the second charging circuit 516.

For example, when the second distance is longer than the first distance, the control circuit 512 may control the current ratio to make the amount of the charging current supplied by the second charging circuit 516 larger than the amount of the charging current supplied by the first charging circuit 514. According to various embodiments, when one of the modem, the RF module, and the AP is used, the control circuit 512 may supply the charging current to the battery 510 and/or the system 520 through the first electrical path by the first charging circuit 514 and the second electrical path by the second charging circuit 516 by controlling the charging current ratio by the first charging circuit 514 and the second charging circuit 516 according to a distance between the used module and each of the first charging circuit 514 and the second charging circuit 516.

Further, the control circuit 512 may make a control to block the current supply by the second charging circuit 516 or to reduce the charging current supplied by the first charging circuit 514 and the second charging circuit 516 according to a heating state in which the temperature of the battery 510 increases by a predetermined temperature or higher while the current is supplied to the battery 510 through the first electrical path by the first charging circuit 514 and the second electrical path by the second charging circuit 516.

Figure 5B:
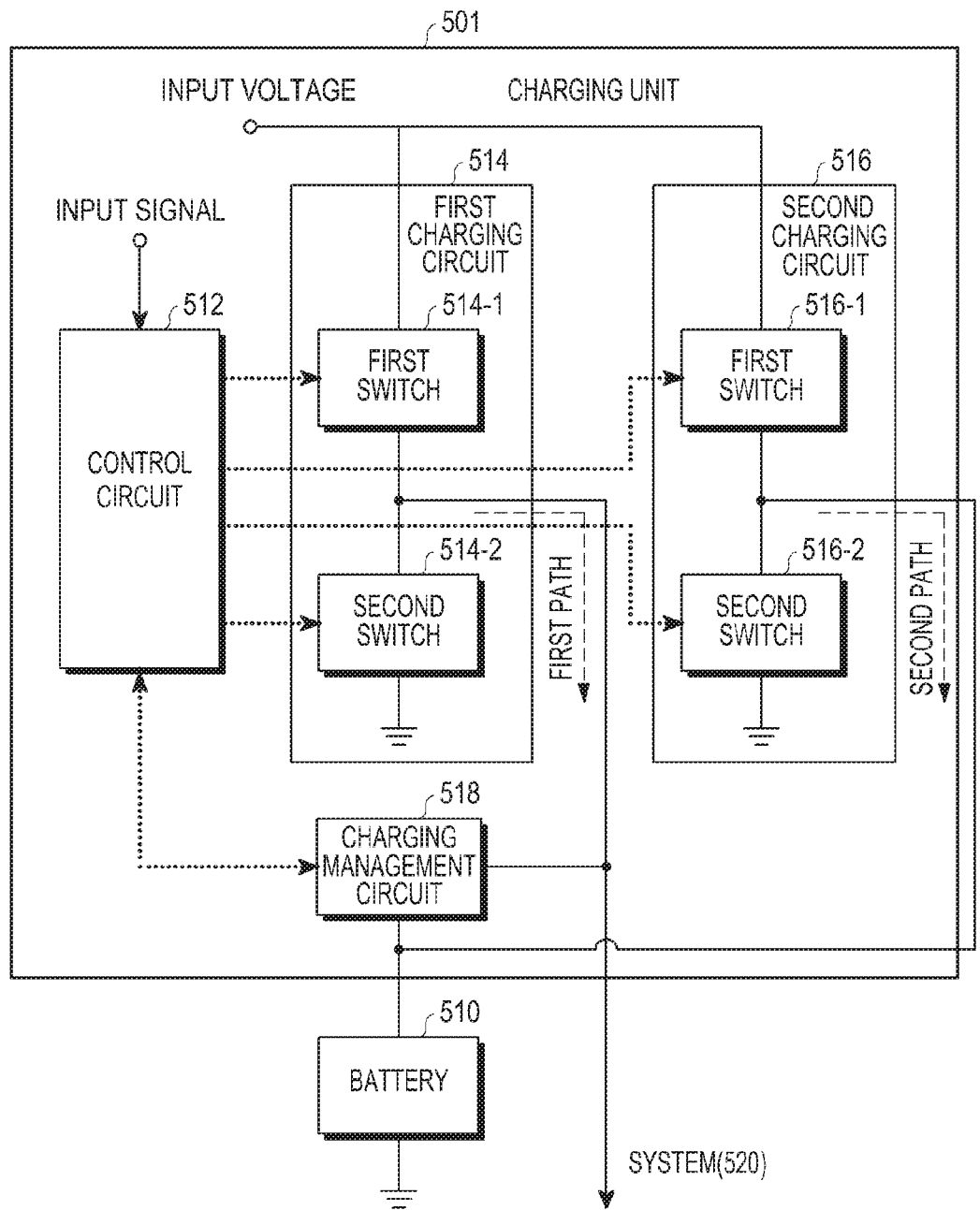

In FIG. 5B, a description of a part equal or similar to FIG. 5A will be omitted. Referring to FIG. 5B, according to an embodiment, the second charging circuit 516 may be configured to provide the charging current only to the battery 510 between the battery 510 and the system 520. According to an embodiment, the control circuit 512 may supply the current to the battery 510 and/or the system 520 preferentially through the first electrical path by the first charging circuit 514. In this example, according to an embodiment, the control circuit 512 may make a control to supply more charging current to the battery 510 through the second electrical path by the second charging circuit 516 according to a charging state or a heating state.

According to another example, the control circuit 512 may supply the voltage to the battery 510 and/or the system 520 through the first charging circuit 514 and supply the voltage only the battery 510 through the second charging circuit 516. In this example, according to a state of the electronic device, the control circuit 512 may stop the voltage supply through one (for example, second charging circuit 516) of the first charging circuit 514 and/or the second charging circuit 516 and supply the voltage to the battery 510 through the other one (for example, first charging circuit 514).

In FIGS. 5A and 5B, an example in which one control circuit 512 controls the first charging circuit 514 and the second charging circuit 516 is made for convenience of the description. According to various embodiments, the number of control circuits is one or more and thus the first charging circuit 514 and the second charging circuit 516 may be controlled by different control circuits. For example, a first control circuit may control the first charging circuit 514 and a second control circuit may control the second charging circuit 516. An additional description thereof will be made with reference to FIG. 5C.

Figure 5C:
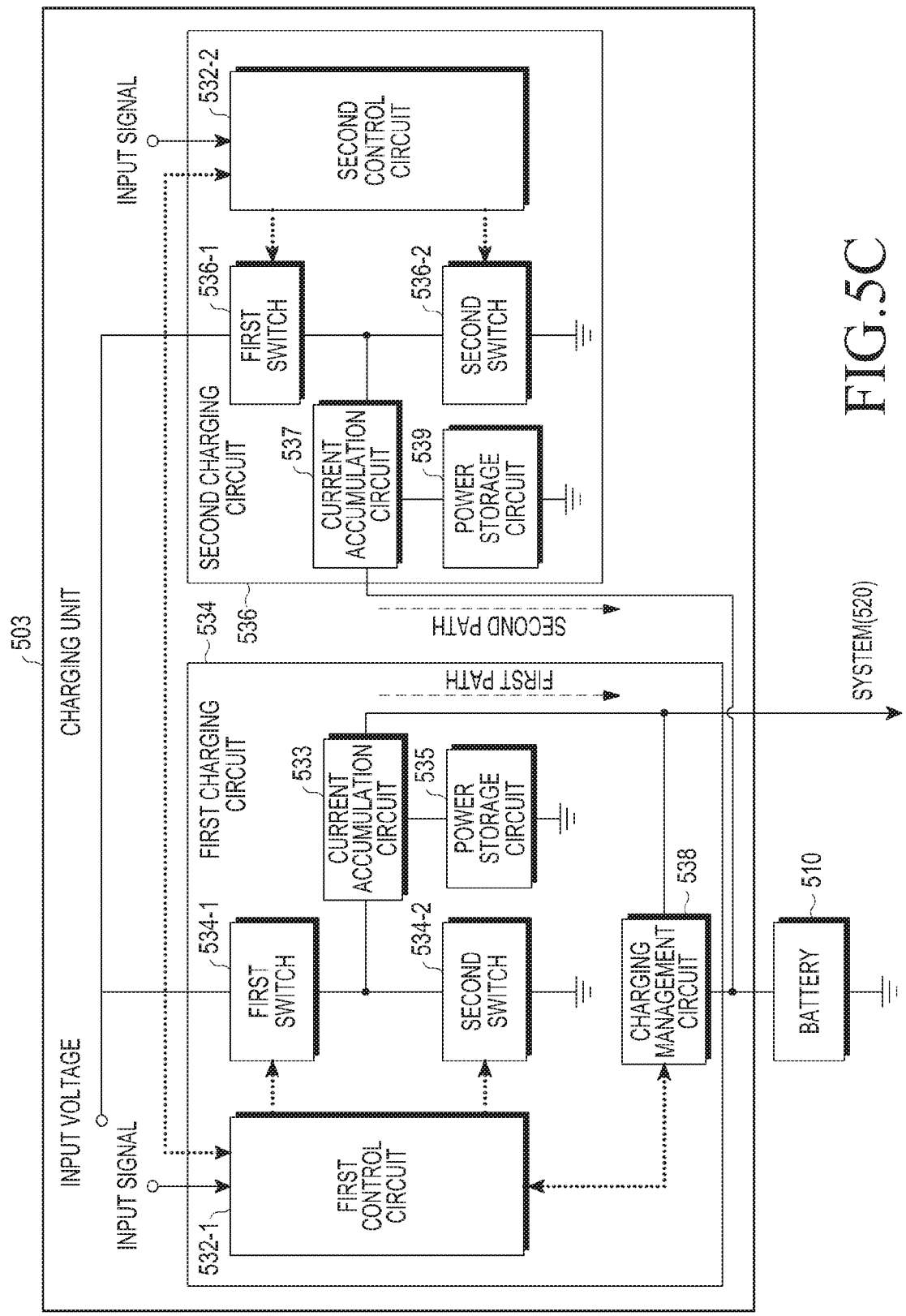

In FIG. 5C, a description of a part equal or similar to FIGS. 5A and 5B will be omitted. Referring to FIG. 5C, the charging unit 503 may include a first charging circuit 534 and a second charging circuit 536. According to various embodiments, the first charging circuit 534 may include a first control circuit 532-1, a first switch 534-1, a second switch 534-2, a current accumulation circuit 533, a power storage circuit 535, and a charging management circuit 538. The second charging circuit 536 may include a second control circuit 532-2, a first switch 536-1, a second switch 536-2, a current accumulation circuit 537, and a power storage circuit 539. According to various embodiments, the first control circuit 532-1 may control the whole first charging circuit 534, the charging management circuit 538, and the second control circuit 532-2. The second control circuit 532-2 may control the second charging circuit 536 according to a control of the first control circuit 532-1.

According to various embodiments, the first control circuit 532-1 may be configured to perform at least one of a charging current sensing function, a charging cut off function, an input current limit function, a Constant Current (CC) loop function, a Constant Voltage (CV) loop function, a termination current loop function, a recharging loop function, and/or a battery to system FET loop function.

According to an embodiment, the second charging circuit 536 may support only a part of the functions supported by the first charging circuit 534 according to the performance of the first charging circuit 534 and the second charging circuit 536. For example, the second control circuit 532-2 may control the second charging circuit 536 to constantly supply the charging current according to the CC loop function as a part of the functions of the first charging circuit 534. In this example, the second control circuit 532-2 may be controlled by, the first control circuit 532-1.

According to various embodiments, each of the first charging circuit 534 and the second charging circuit 536 may receive an input voltage, and may include a plurality of switches. For example, each of the first switch 534-1 and the second switch 534-2 of the first charging circuit 534 may include at least one switch, and may perform a step-up transform operation or a step-down transform operation through an on or off operation according to a control of the first control circuit 532-1. According to an embodiment, the first switch 534-1 may be turned on and the second switch 534-2 may be turned off, or the first switch 534-1 may be turned off and the second switch 534-2 may be turned on according to a control of the first control circuit 532-1. According to an embodiment, when the first switch 534-1 is turned on and the second switch 534-2 is turned off, the current for the charging may be accumulated in the current accumulation circuit 533 and the voltage for the charging may be accumulated in the power storage circuit 535.

The current accumulation circuit 533 may include at least one inductance, and the power storage circuit 535 may include at least one capacitance. When the first switch 534-1 is turned off and the second switch 534-2 is turned on, the voltage and current for the charging may be supplied to the battery 510 or the system 520 through the first electrical path. According to an embodiment, the first switch 534-1 and the second switch 534-2 may include a step-up/step-down transform circuit.

According to an embodiment, each of the first switch 536-1 and the second switch 536-2 of the second charging circuit 536 may include at least one switch and may perform a step-up or step-down transform operation through an on or off operation according to a control of the second control circuit 532-2. According to an embodiment, the first switch 536-1 may be turned on and the second switch 536-2 may be turned off, or the first switch 536-1 may be turned off and the second switch 536-2 may be turned on according to a control of the second control circuit 532-2.

According to an embodiment, when the first switch 536-1 is turned on and the second switch 536-2 is turned off, the current for the charging may be accumulated in the current accumulation circuit 537 and the voltage for the charging may be accumulated in the power storage circuit 539. The current accumulation circuit 537 may include at least one inductance, and the power storage circuit 539 may include at least one capacitance. When the first switch 536-1 is turned off and the second switch 536-2 is turned on, the voltage and current for the charging may be supplied to the battery 510 or the system 520 through the second electrical path. According to an embodiment, the first switch 536-1 and the second switch 536-2 may include a step-up/step-down transform circuit.

The charging management module 538 is the same as the charging management circuit 518 of FIGS. 5A and 5B with only a difference in that the charging management module 538 is controlled by the first control circuit 532-1, so that a detailed description thereof will be omitted.

Figure 5D:
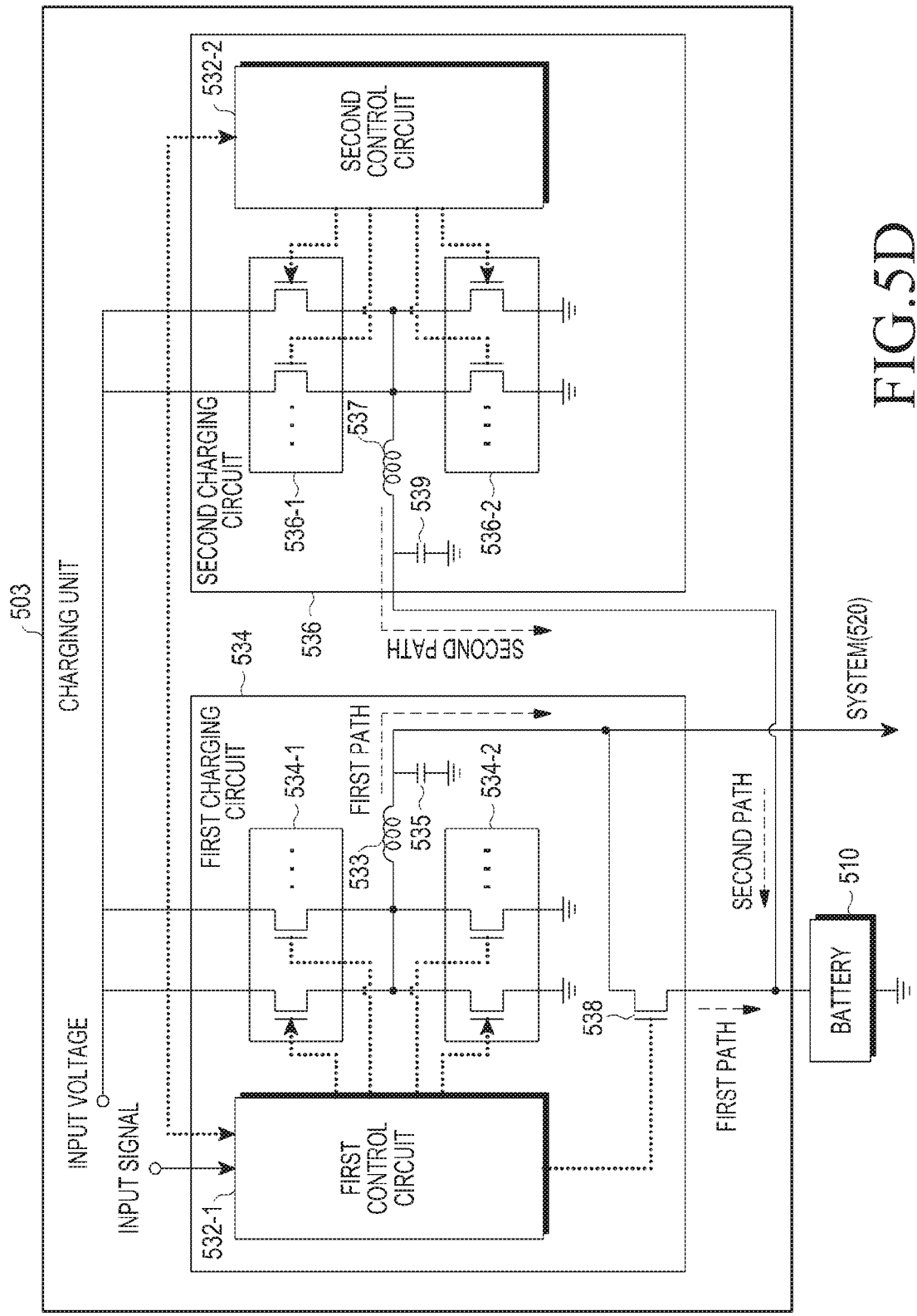

Referring to FIG. 5D, each of the first switch 534-1 and the second switch 534-2 of the first charging circuit 534 and the first switch 536-1 and the second switch 536-2 of the second charging circuit 536 may include a plurality of switches. The first control circuit 532-1 may selectively turn on or off at least some of the plurality of switches included in the first switch 534-1 and the second switch 534-2 according to a charging state or a heating state, and may transfer a control signal for selectively turning on or off at least some of the plurality of switches included in the first switch 536-1 and the second switch 536-2 of the second charging circuit 536 to the second control circuit 532-2. The second control circuit 532-2 may selectively turn on or off at least some of the plurality of switches included in the first switch 536-1 and the second switch 536-2 according to the control signal of the first control circuit 532-1.

According to an embodiment, the first control circuit 532-1 may make a control to selectively turn on or off at least some of the plurality of switches included in the first switch 534-1 and the second switch 534-2 according to a charging state or a heating state and to selectively turn on or off at least some of the plurality of switches included in the first switch 536-1 and the second switch 536-2 of the second charging circuit 536, so as to control an amount of the charging current provided through the first electrical path by the first charging circuit 534 and an amount of the charging current provided through the second electrical path by the second charging circuit 536.

According to an embodiment, the first control circuit 532-1 may control the amount of the charging current provided through the first electrical path by the first charging circuit 534 to be larger than the amount of the charging current provided through the second electrical path by the second charging circuit 536 by controlling the number of turned on switches among the plurality of switches included in the first switch 534-1 and the second switch 534-2 to be larger than the number of turned on switches among the plurality of switches included in the first switch 536-1 and the second switch 536-2. In contrast, the first control circuit 532-1 may control the amount of the charging current provided through the first electrical path by the first charging circuit 534 to be smaller than the amount of the charging current provided through the second electrical path by the second charging circuit 536 by controlling the number of turned on switches among the plurality of switches included in the first switch 534-1 and the second switch 534-2 to be smaller than the number of turned on switches among the plurality of switches included in the first switch 536-1 and the second switch 536-2.

Meanwhile, the current accumulation circuit 533 of the first charging circuit 534 may include at least one inductance, and the power storage circuit 535 may include at least one capacitance. Further, the current accumulation circuit 537 of the second charging circuit 536 may include at least one inductance, and the power storage circuit 539 may include at least one capacitance.

The charging management circuit 538 may include a switch, detect the charging current provided to the battery 510 or the system 520, and perform a switching operation to turn off between the battery 510 and the first electrical path and between the battery 510 and the second electrical path according to a charging stop control signal from the first control circuit 532-1 during overcharging or overheating. Further, the charging management circuit 538 may stop charging the battery 510 by performing the switching operation to turn off between the battery 510 and the first electrical path and between the battery 510 and the second electrical path according to a charging stop control signal from the first control circuit 532-1. In addition, the charging management circuit 538 may perform a switching operation for recharging the battery 510 according to a recharging control signal from the first control circuit 532-1 and a switching operation for controlling the voltage and current between the battery 510 and the system 520 according to a battery to system FET loop control signal from the first control circuit 532-1.

According to various embodiments, in order to make a secondary charging circuit (for example, the second charging circuit 536) simple, the charging unit 503 may allow the input voltage supplied from the external power supply device (for example, the power supply device 402) to be received by a main charging circuit (for example, the first charging circuit 534), and the input voltage may bypass the first charging circuit 534 and may be supplied to the second charging circuit 536 selectively based on a state of the electronic device (for example, the amount of voltage charged in the battery 510). A detailed description thereof will be made with reference to FIG. 5E.

Figure 5E:
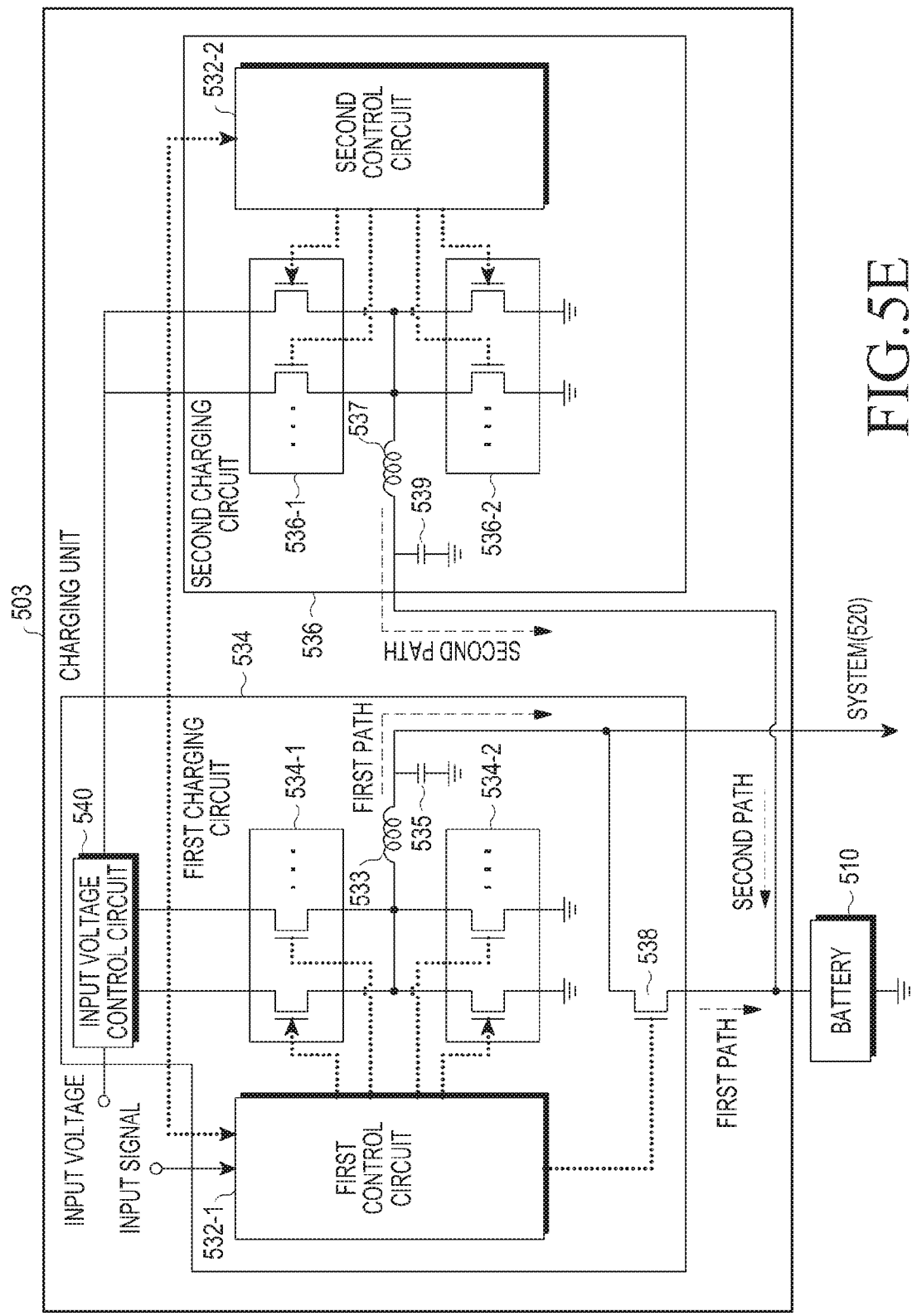

In FIG. 5E, a description of a part equal or similar to FIGS. 5C and 5D will be omitted. Referring to FIG. 5E, the charging unit 503 may include a first charging circuit 534 and a second charging circuit 536. According to various embodiments, the first charging circuit 534 is the same as the first charging circuit 534 of FIG. 5D except that the first charging circuit 534 of FIG. 5E further includes an input voltage control circuit 540, so that a detailed description of the same elements will be omitted.

The input voltage control circuit 540 may accept the input voltage supplied from one or more external power supply devices (for example, the power supply device 402). The input voltage control circuit 540 may control the input voltage to bypass the first charging circuit 534 and to be supplied to the second charging circuit 536 under a control of the first control circuit 532-1. In this example, the second charging circuit 536 may accept the input voltage supplied from the input voltage control circuit 540 under a control of the second control circuit 532-2 without an input current regulation, and thus the voltage and current accumulated through the second electrical path by the second charging circuit 536 may be supplied to the battery 510 and/or the system 520. Although FIG. 5E illustrates that the input voltage control circuit 540 is separated from the first control circuit 532-1, the input voltage control circuit 540 of the present disclosure is not limited thereto and the input voltage control circuit 540 may be implemented while being integrated into the first control circuit 532-1.

Figure 6:
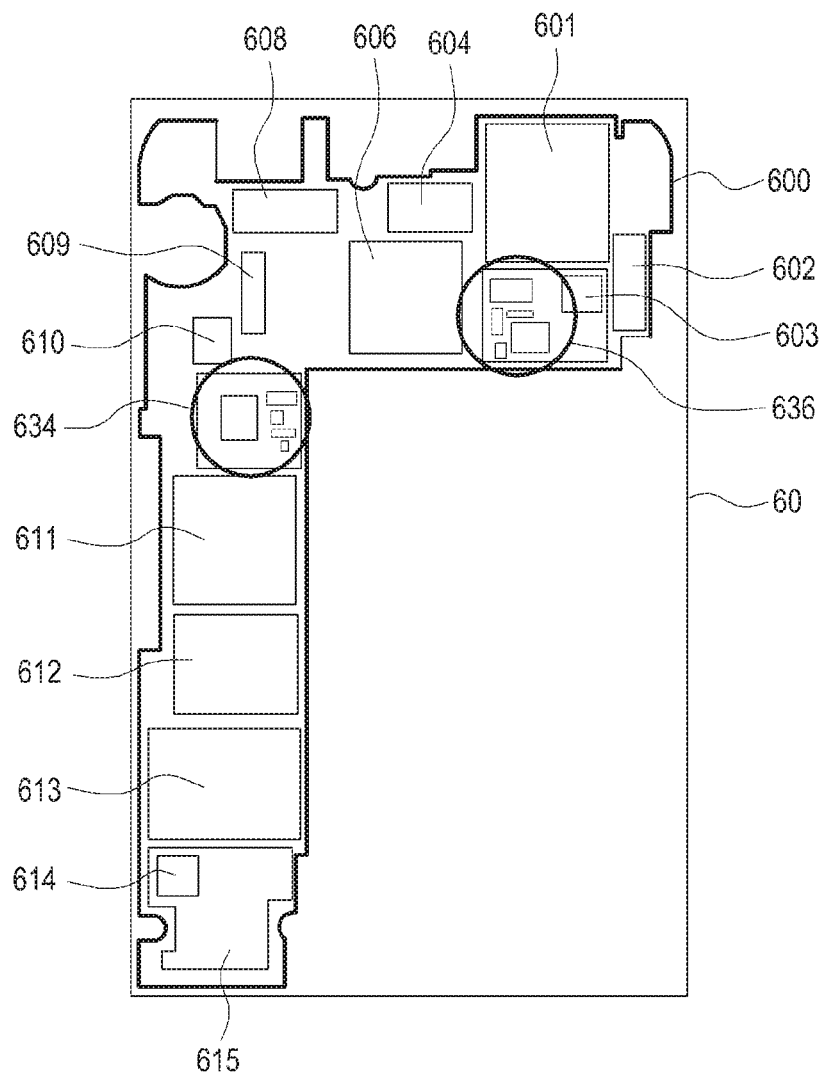
FIG. 6 illustrates mounting of a charging unit in an electronic device according to various embodiments of the present disclosure.

FIG. 6 illustrates an example of mounting of the charging unit in the electronic device according to various embodiments.

Referring to FIG. 6, a first charging circuit 634 and a second charging circuit 636 according to various embodiments may be disposed on a circuit substrate 600 included in a housing 60 of the electronic device, for example, a Printed Circuit Board (PCB) together with a plurality of elements 601-604, 606, and 608-615, and they may be disposed to be physically separated from each other. According to various embodiments, the first charging circuit 634 and the second charging circuit 636 may be disposed to be separated, by a predetermined distance or farther, from an element that is heated at a predetermined heating level or higher. According to various embodiments, the element that is heated at the predetermined heating level or higher may include at least one of a Power Management Integrated Chip (PMIC), an Application Processor (AP), a camera, and a Radio Frequency (RF) module.

Figure 7:
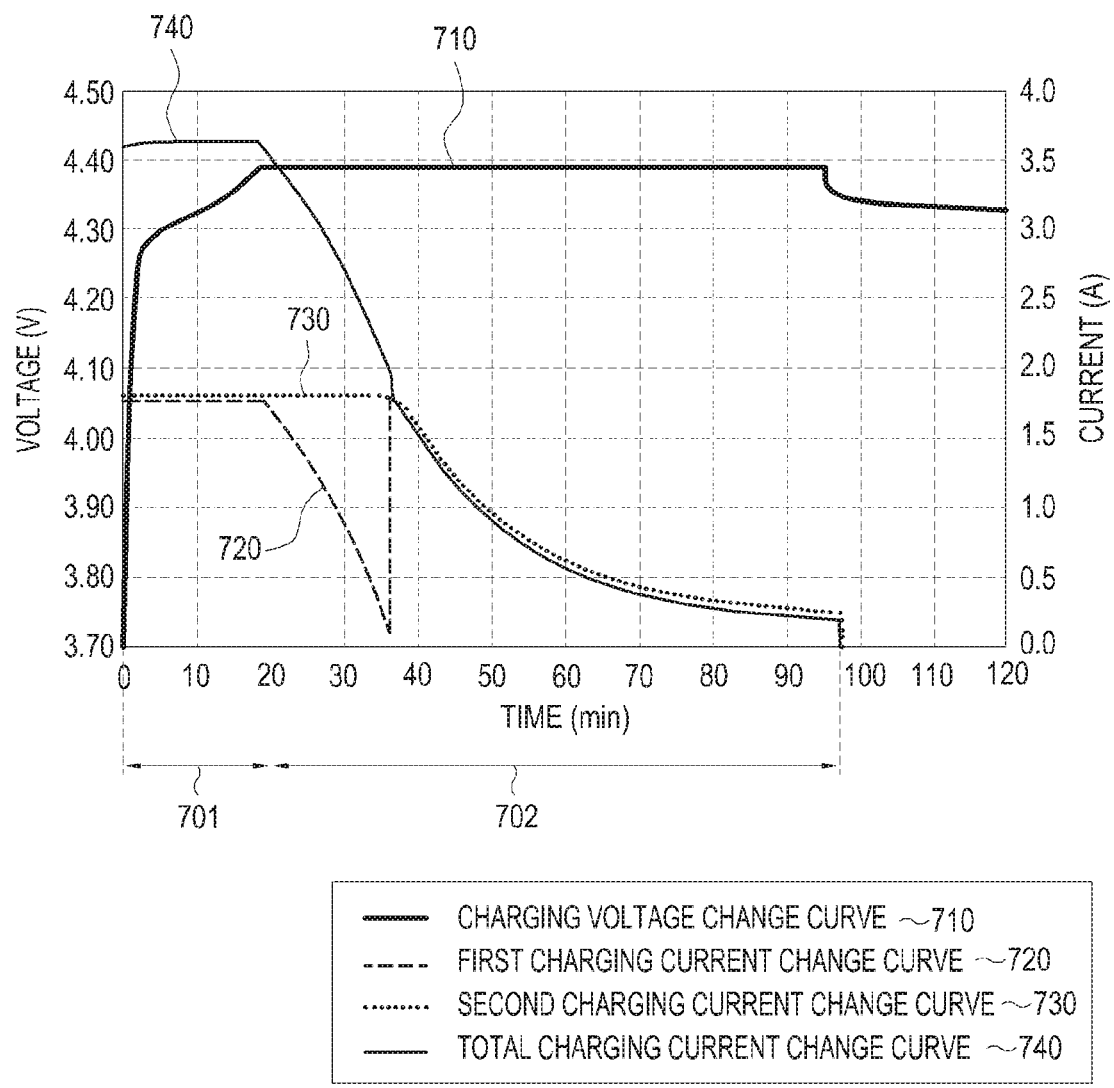
FIGS. 7 and 8 are graphs illustrating changes in a charging voltage provided by a first path and a charging voltage and a charging current provided by a second path according to various embodiments of the present disclosure.
Figure 8:
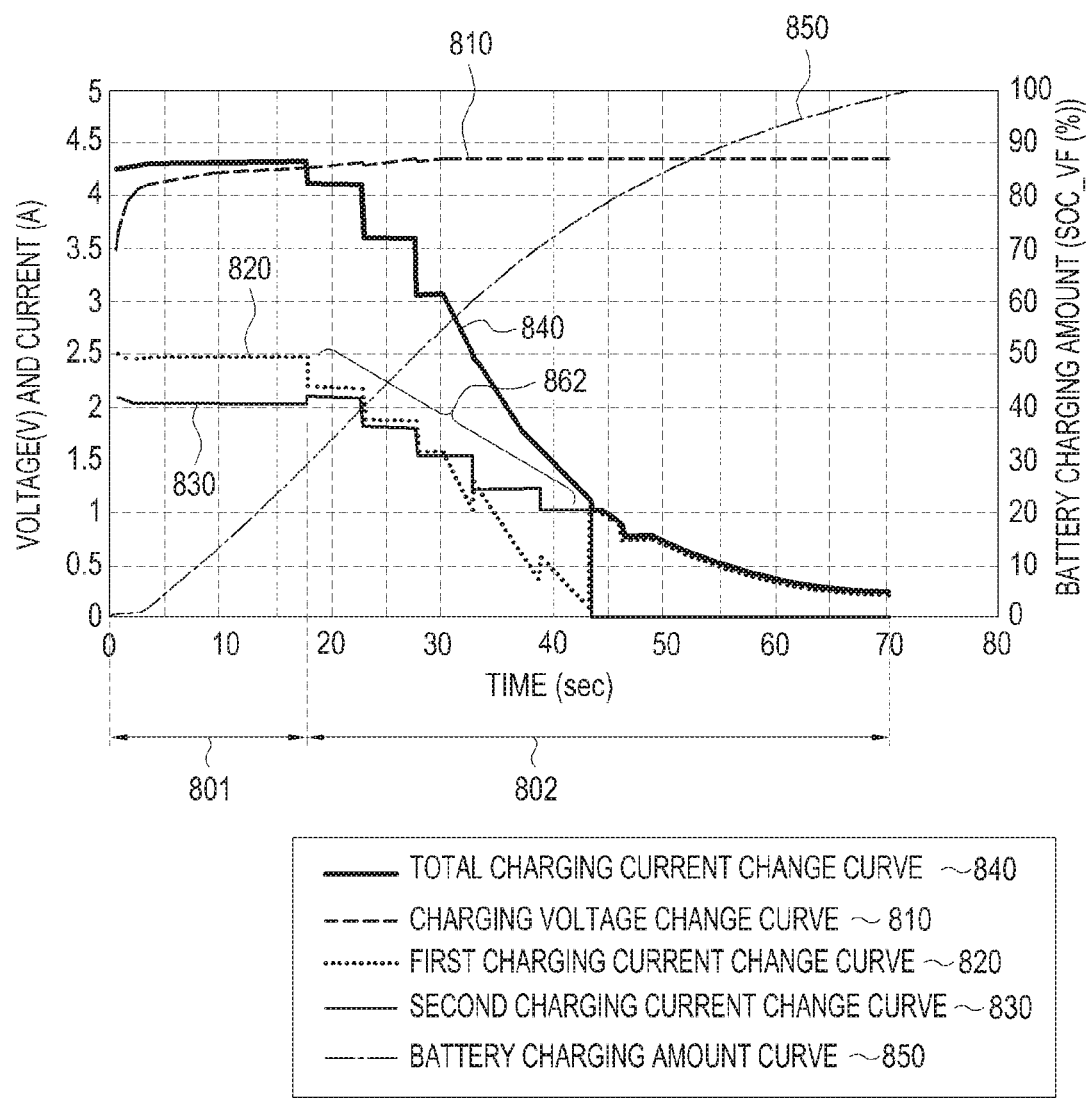

FIGS. 7 and 8 are graphs illustrating changes in the charging voltage and the charging current provided by the first path and the charging voltage and the charging current provided by the second path according to various embodiments.

Referring to FIG. 7, a horizontal axis may indicate a time (min) and a vertical axis may indicate a voltage (V) and a current (A). A charging voltage change curve 710 may indicate a change in the charging voltage provided to the battery. A first charging current change curve 720 may indicate a change in the charging current provided by the first electrical path. A second charging current change curve 730 may indicate a change in the charging current provided by the second electrical path. A total charging current change curve 740 may indicate a change in the total charging current provided by the first and second electrical paths.

According to various embodiments of the present disclosure, when the charging starts, the battery may receive the charging current from both the first electrical path and the second electrical path during a Constant Current (CC) interval 701 in which the charging current provided to the battery is constant. The CC interval 701 switches to a Constant Voltage (CV) interval 702 in which the charging voltage is constant, the charging current supply from the second electrical path may be blocked and the battery may receive the charging current from the first electrical path. According to an embodiment, after the CV interval 702, the amount of charging current provided from the first electrical path may gradually decrease according to a battery charging amount.

Referring to FIG. 8, a horizontal axis may indicate a time (sec) and a vertical axis may indicate a voltage (V), a current (A), and a battery charging amount (SOC_VF (%)). A charging voltage change curve 810 may indicate a change in the charging voltage provided to the battery. A first charging current change curve 820 may indicate a change in the charging current provided by the first electrical path. A second charging current change curve 830 may indicate a change in the charging current provided by the second electrical path. A total charging current change curve 840 may indicate a change in the total charging current provided by the first and second electrical paths. A battery charging amount curve 850 may indicate a change in the battery charging amount.

When the charging starts, the first charging circuit may control the battery to receive the charging current from both the first electrical path by the first charging circuit and the second electrical path by the second charging circuit during the CC interval 801 in which the charging current provided to the battery is constant. When the CC interval 801 switches to the CV interval 802, the first charging circuit may control the charging current provided by each of the first electrical path and the second electrical path to be stepped down as indicated by reference numeral 862. The step down may be performed according to a predetermined time interval and current amount of each electronic device.

According to FIGS. 7 and 8, when the charging current is supplied to the battery through both the first electrical path and the second electrical path, the charging current by the second electrical path may be supplied only in some of the CC intervals 701 and 801. This may protect overcharging of the battery.

According to various embodiments, a method of operating an electronic device may include an operation of supplying at least a part of the current from a power interface to a battery through a first electrical path by an electronic device including the battery and the power interface, an operation of supplying another part of the current from the power interface to the battery through a second electrical path connected to the battery in parallel to the first electrical path by the electronic device, and an operation of selectively controlling the current supply to the battery by the second electrical path at least partially based on a charge level of the battery by the electronic device.

According to various embodiments, the method may further include an operation of blocking the current supply to the battery by the second electrical path when the current supply by the first electrical path switches from a Constant Current (CC) state to a Constant Voltage (CV) state during the current supply to the battery through the first electrical path and the second electrical path.

According to various embodiments, the method may further include an operation of blocking the current supply by the second path or adjusting a charging current supply ratio by the first electrical path and the second electrical path when a charging residual quantity of the battery or a voltage of the battery is higher than or equal to a predetermined level during the current supply to the battery through the first electrical path and the second electrical path.

According to various embodiments, the method may further include an operation of determining an input voltage level input by the power interface and adjusting a charging current supply ratio by the first electrical path and the second electrical path according to the input voltage level.

According to various embodiments, the method may further include an operation of determining a module used by an executed application and adjusting a charging current supply ratio by the first electrical path and the second electrical path according to a distance between the used module and each of a first charging circuit and a second charging circuit that provides the first electrical path and the second electrical path, respectively.

According to various embodiments, the method may further include an operation of making a control to block the current supply by the second electrical path or adjusting a charging current supply ratio by the first electrical path and the second electrical path when a temperature of at least one of at least a part of the circuit, at least a part of the battery, and surroundings of the housing increases to be a predetermined temperature during the current supply to the battery through the first electrical path and the second electrical path.

Figure 9:
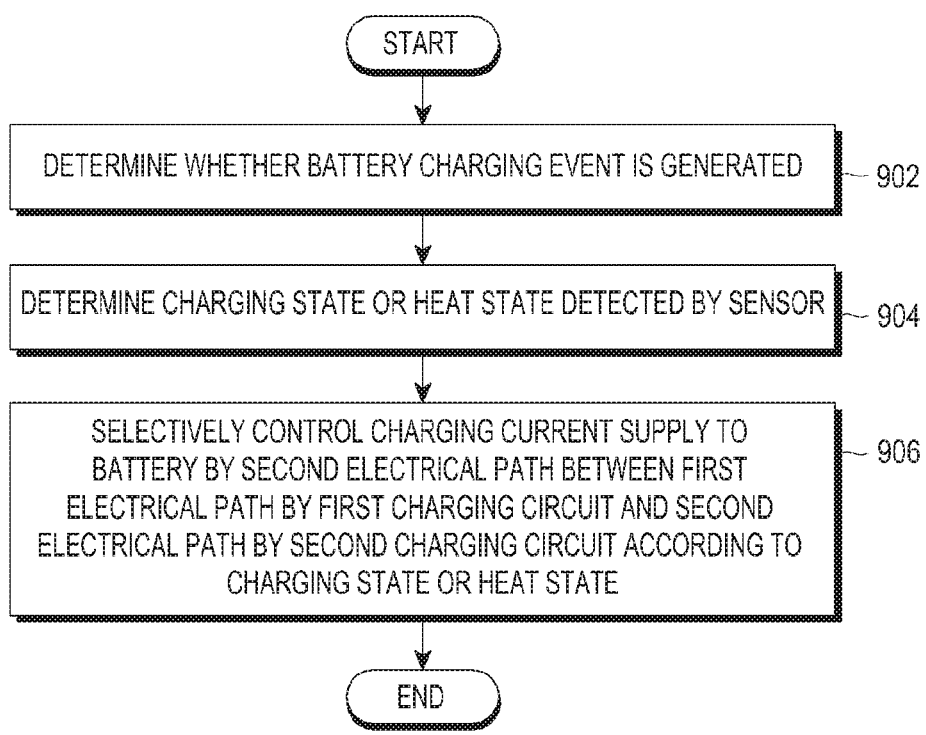
FIG. 9 is a flowchart illustrating a control operation for battery charging in an electronic device according to various embodiments of the present disclosure.

FIG. 9 is a flowchart illustrating a control operation for battery charging in the electronic device according to various embodiments.

Referring to FIG. 9, the electronic device may determine whether a battery charging event is generated in operation 902. According to various embodiments, the electronic device may receive a battery charging request by the user and determine whether an external power supply device is connected to a power interface. When the battery charging request is received or the external power supply device is connected to the power interface, the electronic device may determine that the battery charging event is generated.

The electronic device may determine a charging state or a heating state according to heating detected by a sensor in operation 904.

The electronic device may selectively control power current supply to the battery by the second electrical path between the first electrical path by the first charging circuit and the second electrical path by the second charging circuit according to the charging state or the heating state in operation 906.

According to an embodiment, when a charging level which can be supplied to the battery according to a charging state is higher than a predetermined charging level, the electronic device may make a control to supply the current to the battery through both the first electrical path and the second electrical path. When the charging level which can be supplied to the battery is lower than the predetermined charging level, the electronic device may make a control to supply the current to the battery only through the first electrical path between the first electrical path and the second electrical path.

According to an embodiment, the electronic device may detect heat by each of the first charging circuit and the second charging circuit, make a control to supply the current to the battery through the first electrical path by the first charging circuit when a temperature according to the heat of the first charging circuit is equal to or lower than a predetermined threshold temperature, and make a control to supply the current to the battery through both the first electrical path and the second electrical path when the temperature according to the heat of the first charging circuit is higher than or equal to the predetermined threshold temperature.

FIGS. 10 to 14 are flowcharts illustrating a battery charging operation in the electronic device according to various embodiments.

Figure 10:
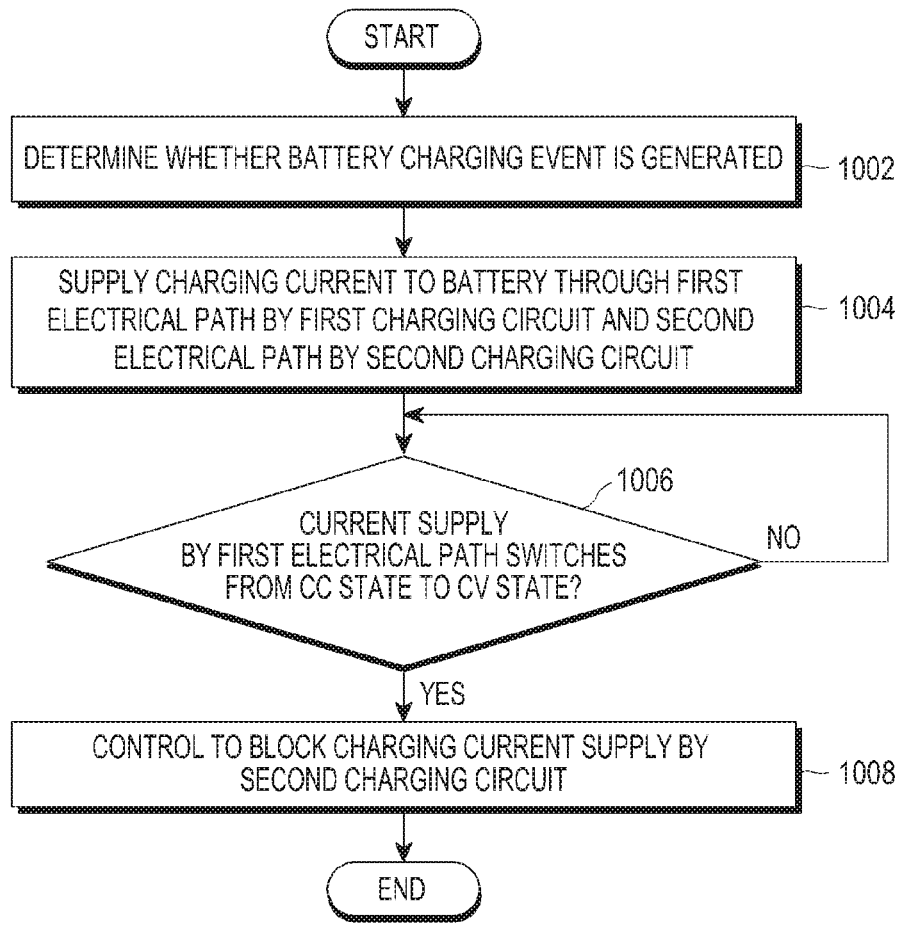
FIGS. 10 to 14 are flowcharts illustrating a battery charging operation in an electronic device according to various embodiments of the present disclosure.

Referring to FIG. 10, the electronic device may determine whether a battery charging event is generated in operation 1002. According to various embodiments, the electronic device may determine that the battery charging event is generated when an input corresponding to a battery charging request is received or an external power supply device is connected to a power interface. According to an embodiment, the battery charging event may be an adaptive fast charging event or a high voltage charging event.

When the battery charging event is generated, the electronic device may supply the current to the battery through the first electrical path by the first charging circuit and the second electrical path by the second charging circuit in operation 1004.

The electronic device may determine whether the current supply by the first electrical path switches from a CC state to a CV state in operation 1006. According to an embodiment, when the charging starts, the electronic device may determine whether the state of the current supply to the battery becomes a state in which the charging voltage is constant, for example, the CV state from the CC state, that is, a state in which a constant charging current is supplied.

When the current supply by the first electrical path switches from the CC state to the CV state, the electronic device may make a control to block the current supply by the second charging circuit in operation 1008. When the current supply by the first electrical path does not switch from the CC state to the CV state, the electronic device may supply the current to the battery through the first electrical path by the first charging circuit and the second electrical path by the second charging circuit until the current supply by the first electrical path switches from the CC state to the CV state.

Figure 11:
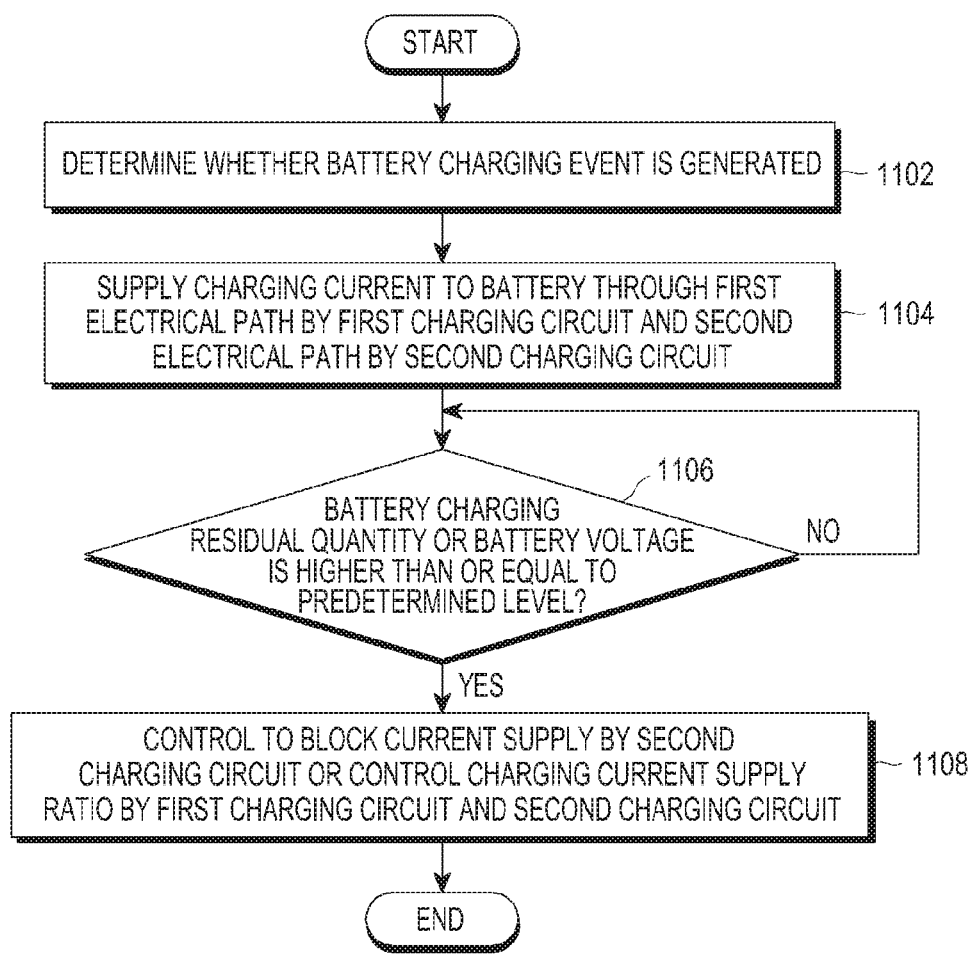

Referring to FIG. 11, the electronic device may determine whether a battery charging event is generated in operation 1102. According to various embodiments, the electronic device may receive a battery charging request input by the user. Further, the electronic device may determine whether the external power supply device is connected to the power interface. When the battery charging request input is received or the external power supply device is connected, the electronic device may determine that the battery charging event is generated.

When the battery charging event is generated, the electronic device may supply the current to the battery through the first electrical path by the first charging circuit and the second electrical path by the second charging circuit in operation 1104.

The electronic device may determine whether a charging residual quantity of the battery or a voltage of the battery is higher than or equal to a predetermined level in operation 1106. For example, the electronic device may detect the charging residual quantity of the battery through a control of the power path connected to the battery and a current detection circuit and determine whether the charging residual quantity of the battery is larger than or equal to a charging residual quantity of a predetermined level. Further, the electronic device may detect the voltage of the battery through the control of power path connected to the battery and the current detection circuit and determine whether the detected battery voltage is higher than or equal to a voltage of a predetermined level.

When the charging residual quantity of the battery or the voltage of the battery is higher than or equal to the predetermined level, the electronic device may make a control to block current supply to the battery through the second electrical path by the second charging circuit or control a charging current supplyratio by the first charging circuit and the second charging circuit in operation 1108. For example, when the electronic device reaches a charging state in which the charging residual quantity of the battery or the voltage of the battery is higher than or equal to the predetermined level while the current is supplied to the battery through the first electrical path by the first charging circuit and the second electrical path by the second charging circuit, the electronic device may block the charging current supplied by the second charging circuit or control the charging current ratio to reduce the charging current supplied by the second charging circuit. According to an embodiment, the charging current ratio may be a ratio between the charging current supplied by the first charging circuit and the charging current supplied by the second charging circuit, which corresponds to a predetermined ratio.

Figure 12:
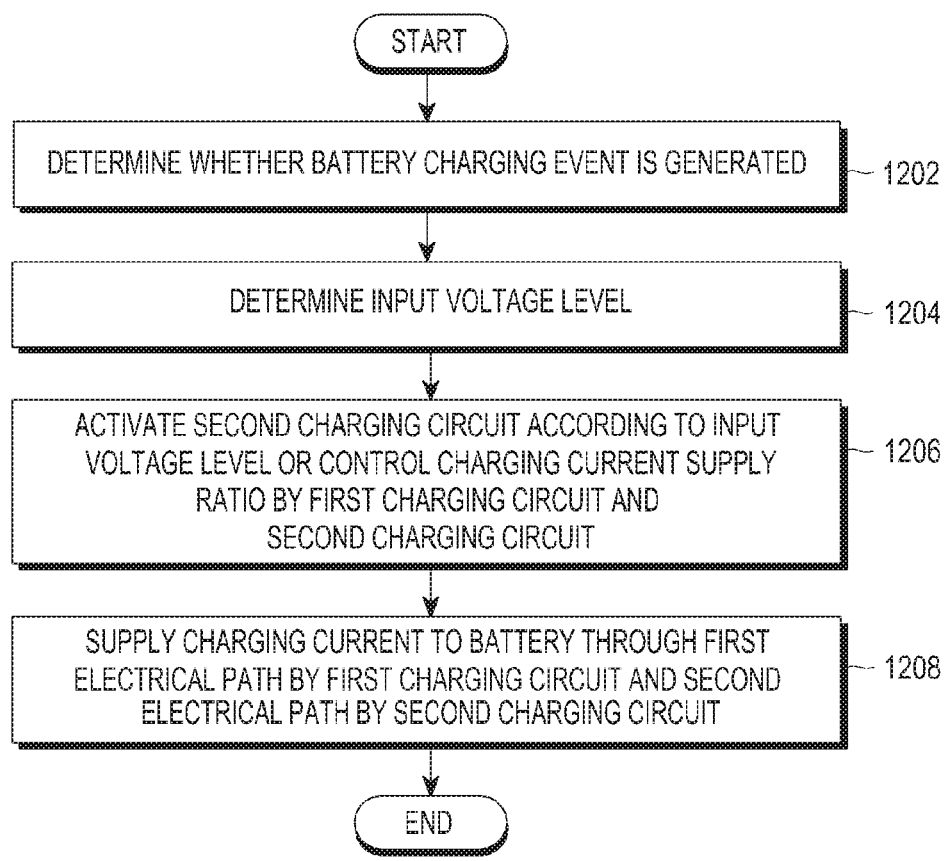

Referring to FIG. 12, the electronic device may determine whether a battery charging event is generated in operation 1202. According to various embodiments, when the battery charging request is received from the user or the external power supply device is connected to the power interface, the electronic device may determine that the battery charging event is generated. According to an embodiment, the battery charging event may be an adaptive fast charging event or a high voltage charging event.

When the battery charging event is generated, the electronic device may determine an input voltage level in operation 1204. According to an embodiment, the electronic device may determine an input voltage level provided from the external device connected through the power interface. For example, the input voltage level may be 5V, 9V, 12V, 15V, 20V, and 25V and may also be various input voltage levels, but may not be limited to a particular input voltage level.

The electronic device may activate the second charging circuit or control the charging current supply ratio by the first charging circuit and the second charging circuit according to the input voltage level in operation 1206. According to an embodiment, when an input voltage of a predetermined threshold voltage or higher is received, the electronic device may activate the second charging circuit for fast charging or control the charging current supply ratio by the first charging circuit and the second charging circuit. According to an embodiment, the electronic device may activate only the first charging circuit when the input voltage equal to or lower than 5 V, and further activate the second charging circuit for fast charging when the input voltage higher than or equal to 5V. According to an embodiment, when the input voltage equal to or lower than 5 V is received, the electronic device may perform charging by activating both the first charging circuit and the second charging circuit and then, when the input voltage higher than or equal to 5 V is received, increase the charging current ratio by the second charging circuit for fast charging.

The electronic device may supply the charging current to the battery through the first electrical path by the first charging circuit and the second electrical path by the second charging circuit in operation 1208. According to an embodiment, the electronic device may supply the charging current to the battery according to whether the second charging circuit is activated and the controlled charging current supply ratio.

Figure 13:
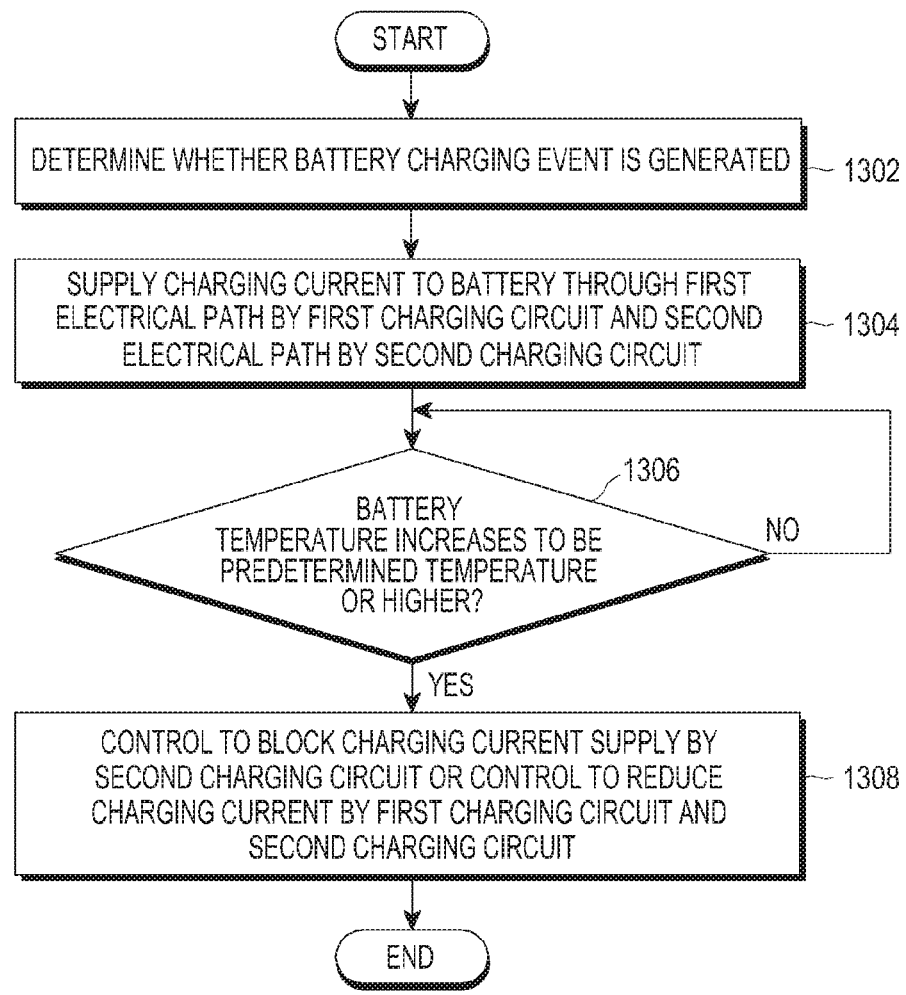

Referring to FIG. 13, the electronic device may determine whether a battery charging event is generated in operation 1302. According to various embodiments, when the battery charging request is received from the user or the external power supply device is connected to the power interface, the electronic device may determine that the battery charging event is generated. According to an embodiment, the battery charging event may be an adaptive fast charging event.

When the battery charging event is generated, the electronic device may supply the charging current to the battery through the first electrical path by the first charging circuit and the second electrical path by the second charging circuit in operation 1304.

The electronic device may determine whether a battery temperature increases to be a predetermined temperature or higher in operation 1306. According to an embodiment, the electronic device may determine whether at least a part of the circuit, at least a part of the battery, or at least one part of the surroundings of the housing increases to be the predetermined temperature or higher. According to an embodiment, the electronic device may determine the temperature increase through a sensor unit. According to an embodiment, the sensor unit may include a temperature sensor.

When the battery temperature increases to be the predetermined temperature or higher, the electronic device may make a control to block the current supply by the second charging circuit or to reduce the charging current by the first charging circuit and the second charging circuit in operation 1308. According to an embodiment, the electronic device may block the current supply by the second charging circuit by transferring a control signal to block the current supply to the second charging circuit between the first charging circuit and the second charging circuit through the control circuit. According to an embodiment, the electronic device may make a control to reduce the charging current supply by the first and second charging circuits by transferring a control signal to reduce a charging current amount to each the first charging circuit and the second charging circuit through the control logic.

Figure 14:
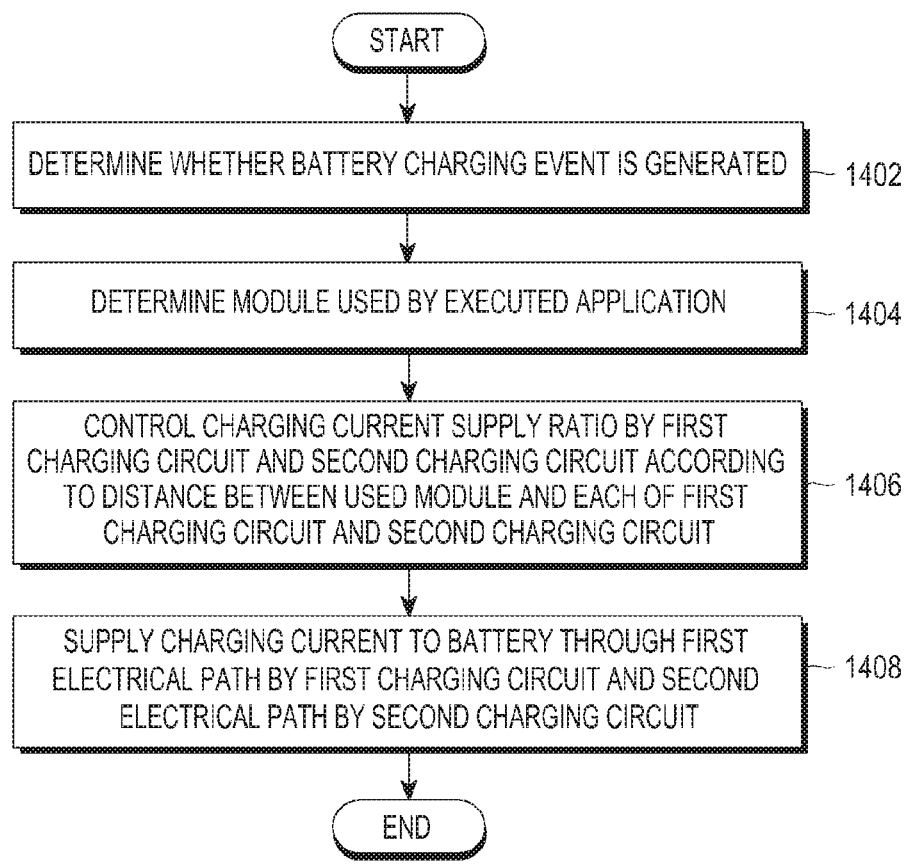

Referring to FIG. 14, the electronic device may determine whether a battery charging event is generated in operation 1402. According to various embodiments, the electronic device may receive a battery charging request input by the user or recognize a connection between a power interface and an external power supply device. When the battery charging request is received or the external power supply device is connected to the power interface, the electronic device may determine that the battery charging event is generated. According to an embodiment, the battery charging event may be an adaptive fast charging event or a high voltage charging event.

When the battery charging event is generated, the electronic device may determine a module used by an executed application in operation 1404. According to an embodiment, the electronic device may determine whether the executed application uses an Application Processor (AP), a communication module (mobile communication module or a Wi-Fi module), or a camera module, and which module is more frequently used among the used modules.

The electronic device may control a charging current ratio by the first charging circuit and the second charging circuit according to a distance between the used module and each of the first charging circuit and the second charging circuit in operation 1406. For example, since heat generated when the first charging circuit and the second charging circuit provide the charging current may influence the performance of the used module, it is efficient to provide the charging current through the charging circuit spaced farther from the used module. According to an embodiment, when the distance between the used module and the first charging circuit is longer than the distance between the used module and the second charging circuit, the electronic device may increase the ratio of the charging current provided by the first charging circuit. In contrast, when distance between the used module and the first charging circuit is shorter than the distance between the used module and the second charging circuit, the electronic device may increase the ratio of the charging current provided by the second charging circuit.

The electronic device may supply the current to the battery through the first electrical path by the first charging circuit and the second electrical path by the second charging circuit according to the charging current supply ratio in operation 1408.

According to an embodiment, when the camera module is used, the electronic device may determine a distance between the camera module and each of the first charging circuit and the second charging circuit, compare a first distance between the first charging circuit and the camera module with a second distance between the second charging circuit and the camera module, control the current ratio to make an amount of the charging current supplied by the first charging circuit larger than an amount of the charging current supplied by the second charging circuit when the first distance is longer, and control the current ratio to make the amount of the charging current supplied by the second charging circuit larger than the amount of the charging current supplied by the first charging circuit when the second distance is longer. According to various embodiments, when one of the modem, the RF module, and the AP is used, the electronic device may supply the charging current to the battery through the first electrical path by the first charging circuit and the second electrical path by the second charging circuit by controlling the charging current ratio by the first charging circuit and the second charging circuit according to the distance between the used module and each of the first charging circuit and the second charging circuit.

According to the various embodiments of the present disclosure described above, it is possible to reduce overheating and loss power when charging is performed by distributing and providing the charging current through a plurality of charging circuits instead of providing the high charging current through one charging circuit. Further, according to various embodiments of the present disclosure, more efficient charging can be performed by selectively using one of the plurality of charging circuits when fast charging or charging in a particular situation is performed.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
a housing;
a display;
a battery mounted within the housing;
a power interface mounted to a part of the housing or disposed within the housing, and configured to receive power from an external power source wirelessly or through a wire;
first charging circuitry;
second charging circuitry;
at least one sensor;
control circuitry; and
at least one processor, wherein the at least one processor is configured to control the display to display a screen capable of selecting a first mode among a plurality of modes in response to a user input, wherein the control circuitry is configured to:
in response to selecting the first mode, supply, via the first charging circuitry, a first part of a current supplied from the power interface to the battery, supply, via the first charging circuitry, a second part of the current to at least one electronic element included in the electronic device, and supply, via the second charging circuitry, a third part of the current to the battery, and
control the second charging circuitry to block the third part of the current not to be supplied to the battery based on detecting heat generated in a part of the battery by the at least one sensor,
wherein the second charging circuitry is connected to the battery in parallel to the first charging circuitry,
wherein the first part of the current and the third part of the current are supplied to the battery simultaneously,
wherein the plurality of modes includes the first mode, a second mode, a third mode, and a fourth mode, and
wherein the first mode is a mode in which both the first charging circuitry and the second charging circuitry are driven, the second mode is a mode in which only the second charging circuitry is driven, the third mode is a mode in which only the first charging circuitry is driven, and the fourth mode is a mode in which the first charging circuitry is driven and the second charging circuitry is selectively driven.

2. The electronic device of claim 1, wherein the control circuitry is configured to block the third part of the current supplied to the battery via the second charging circuitry at least partially based on a determination that a charge level of the battery is higher than a threshold value.

3. The electronic device of claim 1, wherein the control circuitry is configured to limit an amount of power received from the external power source.

4. The electronic device of claim 1, wherein the control circuitry initiates a control causing the control circuitry to block the current supplied to the battery via the second charging circuitry when the current supplied via the first charging circuitry switches from a Constant Current (CC) state to a Constant Voltage (CV) state while supplying current from the power interface to the battery.

5. The electronic device of claim 1, wherein the control circuitry initiates a control causing the control circuitry to block the current supplied to the battery via the second charging circuitry or to adjust a charging current supply ratio via the first charging circuitry and the second charging circuitry when a charging residual quantity of the battery or a voltage of the battery is higher than or equal to a predetermined level while supplying current from the power interface to the battery.

6. The electronic device of claim 1, wherein the control circuitry determines an input voltage level received from the power interface and initiates a control causing the control circuitry to adjust a charging current supply ratio via the first charging circuitry and the second charging circuitry according to the input voltage level.

7. The electronic device of claim 1, wherein the control circuitry determines a module used by an executed application and initiates a control causing the control circuitry to adjust a charging current supply ratio via the first charging circuitry and the second charging circuitry, wherein adjustment is based on a distance between the module used by the executed application and each of the first charging circuitry and the second charging circuitry.

8. The electronic device of claim 1, wherein the control circuitry initiates a control causing the control circuitry to block the current supplied via the second charging circuitry or to adjust a charging current supply ratio via the first charging circuitry and the second charging circuitry when a temperature of at least one of a part of the first charging circuitry and the second charging circuitry, a part of the battery, and surroundings of the housing, increases to a predetermined temperature while supplying current from the power interface to the battery.

9. The electronic device of claim 1, wherein the first charging circuitry is electrically connected between the power interface, the battery, and the at least one electronic element within the electronic device, and
wherein the second charging circuitry is electrically connected between the power interface and the battery.

10. The electronic device of claim 1,
wherein the first charging circuitry is a main charging circuit electrically connected between the power interface, the battery, and the at least one electronic element within the electronic device, and
wherein the second charging circuitry is a secondary charging circuit electrically connected between the main charging circuit and the battery.

11. The electronic device of claim 10, wherein the main charging circuit comprises:
a first terminal electrically connected to the power interface;
a second terminal electrically connected to the second charging circuitry; and
a third terminal electrically connected to the battery.

12. The electronic device of claim 11, wherein the main charging circuit further comprises a fourth terminal electrically connected to the at least one electronic element included in the electronic device.

13. A method of charging a battery using a plurality of charging circuits in an electronic device, the method comprising:
displaying, on a display of the electronic device, a screen capable of selecting a first mode among a plurality of modes in response to a user input;
in response to selecting the first mode, supplying, via first charging circuitry of the electronic device, a first part of a current supplied from a power interface to a battery, supplying, via the first charging circuitry, a second part of the current supplied from the power interface to at least one electronic element included in the electronic device, wherein the power interface, the battery, and the first charging circuitry are all included in the electronic device, and supplying, via second charging circuitry of the electronic device, a third part of the current to the battery via a second electrical path connected to the battery in parallel to the first charging circuitry and disposed within the electronic device; and
blocking, via the second charging circuitry, the third part of the current not to be supplied to the battery based on detecting heat generated in a part of the battery by at least one sensor of the electronic device,
wherein the second charging circuitry is connected to the battery in parallel with the first charging circuitry,
wherein the first part of the current and the third part of the current are supplied to the battery simultaneously,
wherein the plurality of modes includes the first mode, a second mode, a third mode, and a fourth mode, and
wherein the first mode is a mode in which both the first charging circuitry and the second charging circuitry are driven, the second mode is a mode in which only the second charging circuitry is driven, the third mode is a mode in which only the first charging circuitry is driven, and the fourth mode is a mode in which the first charging circuitry is driven and the second charging circuitry is selectively driven.

14. The method of claim 13,
wherein the first charging circuitry is electrically connected between the power interface, the battery, and the at least one electronic element included in the electronic device; and
wherein the second charging circuitry is electrically connected between the power interface and the battery.

15. The method of claim 13,
wherein the first charging circuitry is a main charging circuit electrically connected between the power interface, the battery, and the at least one electronic element included in the electronic device; and
wherein the second charging circuitry is a secondary charging circuit electrically connected between the main charging circuit and the battery.

16. An electronic device comprises:
a housing;
a display;
a battery mounted within the housing;
a power interface mounted to a part of the housing and configured to connect to an external power source wirelessly or through a wire;
at least one sensor disposed within the housing;
first charging circuitry;
second charging circuitry;
control circuitry; and
at least one processor, wherein the at least one processor is configured to control the display to display a screen capable of selecting a first mode among a plurality of modes in response to a user input,
wherein the control circuitry is configured to:
in response to selecting the first mode, supply, via the first charging circuitry, a first part of a current supplied from the power interface to the battery and supply, via the second charging circuitry, a second part of the current to at least one electronic element included in the electronic device, and supply, via the second charging circuitry, a third part of the current to the battery, the second charging circuitry connected to the battery in parallel to the first charging circuitry, and
control the second charging circuitry to block the third part of the current not to be supplied to the battery based on detecting heat generated in a part of the battery by the at least one sensor,
wherein the second charging circuitry is connected to the battery in parallel with the first charging circuitry,
wherein the first part of the current and the third part of the current are supplied to the battery simultaneously,
wherein the plurality of modes includes the first mode, a second mode, a third mode, and a fourth mode, and
wherein the first mode is a mode in which both the first charging circuitry and the second charging circuitry are driven, the second mode is a mode in which only the second charging circuitry is driven, the third mode is a mode in which only the first charging circuitry is driven, and the fourth mode is a mode in which the first charging circuitry is driven and the second charging circuitry is selectively driven.

* * * * *